Figure 1:
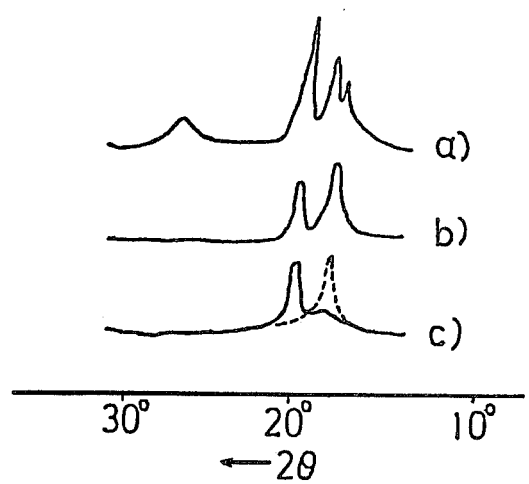

United States Patent [19]

Tatemoto et al.

[11] 4,158,678

[45] Jun. 19, 1979

[54] SEGMENTED POLYMERS CONTAINING FLUORINE AND IODINE AND THEIR PRODUCTION

[75] Inventors: Masayoshi Tatemoto; Tsuneo Nakagawa, both of Ibaraki, Japan

[73] Assignee: Daikin Kogyo Co., Ltd., Osaka, Japan

[21] Appl. No.: 811,987

[22] Filed: Jun. 30, 1977

[30] Foreign Application Priority Data

Jun. 30, 1976 [JP] Japan .................................. 51-78030

[51] Int. Cl.² ...................... C08L 27/04; C08L 27/10; C08L 27/12
[52] U.S. Cl. ................................ 260/884; 260/878 B; 204/159.15; 204/159.2
[58] Field of Search ........................... 260/884, 878 B; 204/159.15, 159.2

[56] References Cited
U.S. PATENT DOCUMENTS 3,574,791  4/1971  Sherman et al. ..................... 260/884

Primary Examiner—Carman J. Seccuro

Attorney, Agent, or Firm—Birch, Stewart, Kolasch and Birch

[57] ABSTRACT

A segmented polymer comprising a sequence of two or more polymer segments, an iodine atom liberated from an iodinated compound bonded at a terminal position of said sequence and a fragment of the iodinated compound from which at least one iodine atom has been removed bonded at another terminal position of said sequence, whereby said sequence intervenes between said iodine atom and said fragment, wherein adjacent polymer segments are different in steric configuration or monomeric composition, at least one of said polymer segments containing fluorine and each polymer segment having a molecular weight of not less than 10,000 but at least one polymer segment having a molecular weight of not less than 30,000. The polymer may contain additional moieties which originate from the monomers which constitute the polymer segments and from the iodinated compound, when the latter has a polymerizable double bond. The segmented polymers are prepared in a sequence of steps involving radical polymerization.

46 Claims, 12 Drawing Figures

Temperature (°C)

To block segment (% by weight)

Temperature (°C)

Draw ratio

SEGMENTED POLYMERS CONTAINING FLUORINE AND IODINE AND THEIR PRODUCTION

The present invention relates to segmented polymers and their production. More particularly, it relates to segmented polymers having two or more polymer segments of which at least one polymer segment is a fluorine-containing one and their production.

The segmented polymers of the present invention comprise an iodine atom liberated from an iodinated compound wherein the iodine atom is bonded to a carbon atom and the fragment of the iodinated compound excluding the iodine atom therefrom, and a sequence of two or more polymer segments, of which at least one polymer segment is a fluorine-containing one, intervening between the said iodine atom and the said fragment. In other words, the segmented polymers of the invention comprise a sequence of two or more polymer segments, of which at least one polymer segment is a fluorine-containing one, and an iodine atom liberated from an iodinated compound wherein the iodine atom is bonded to a carbon atom and the fragment of the iodinated compound excluding the iodine atom therefrom present at both terminal positions of a sequence of the polymer segments. Thus, the fundamental structure of the segmented polymers is schematically representable by the formula:

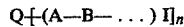

wherein Q is the fragment of an iodinated compound excluding the iodine atom therefrom, A, B, ... are each a polymer segment, I is an iodine atom liberated from the iodinated compound and n represents the number of the bonding of X.

Polymers of said type are generally known as a "block polymer" or "graft polymer" and can be produced by various methods including a sequential growth method as adopted in the production of living polymers, a coupling method wherein two or more polymers are subjected to coupling, an addition polymerization or polycondensation method utilizing the reactivity of terminal functional groups and a radical polymerization method using a polymeric initiating agent or a polymeric chain transfer agent. These conventional methods, however, require prepolymers having certain specific functional groups at the terminal positions, of which the production with a high purity is usually difficult.

On the other hand, there are known some methods for production of segmented polymers having two or more polymer segments, of which at least one polymer segment is a fluorine-containing one. Examples of them are a method for production of block telomers having polymer segments of low molecular weights by the use of Hg or ultraviolet rays as a reaction accelerator [U.S. Pat. No. 3,900,380], a method for production of block copolymers by polymerization of ethylenically unsaturated compounds in the presence of poly(perfluoroether) polyperoxide [Japanese Patent Publication (unexamined) No. 6193/1972], a method for production of cotelomers by reacting a bromine-containing telomer of tetrafluoroethylene with ethylene [Japanese Patent Publication (unexamined) No. 30984/1975], etc. There is also known a method for telomerization of fluoroolefins using polyfluoroalkyl iodide as a telogen in the presence of a radical initiator ["Telomerization", U.S. Naval Res. Rab. Rept. PB 131,930; British Pat. No. 824,229, etc.].

It has now been found that a certain iodinated compound is relatively weak in the bond between an iodine atom and a carbon atom (hereinafter referred to as "I—C bond") so that the cleavage of such bond can be readily caused by a radical producing source. Since the reactivity of the radical produced from such cleavage is sufficiently high, it can initiate the polymerization of unsaturated polymerizable monomers to produce a polymer of high molecular weight. The growth of the polymer is interrupted by a chain transfer reaction, i.e. drawing an iodine atom from the iodinated compound. The I—C bond between the terminal carbon atom and the iodine atom in the resulting polymer is likewise cleavable with a radical producing source, and therefore it is possible to grow a further polymeric chain originated from unsaturated polymerizable monomers on the previously formed polymer. Thus, it is quite possible to extend sequentially the polymeric chain to produce a segmented polymer. The present invention is based on the above finding.

According to the present invention, there is provided a segmented polymer which comprises a sequence of two or more polymer segments, in which a polymer segment is different from another polymer segment adjacent thereto in steric configuration or monomeric composition, at least one polymer segment is a fluorine-containing one and each polymer segment has a molecular weight of not less than 10,000 but at least one polymer segment has a molecular weight of not less than 30,000, and an iodine atom liberated from an iodinated compound and a fragment of the iodinated compound excluding at least one iodine atom therefrom, the fragment comprising additionally any moieties originated from the monomer(s) constituting the polymer segments and from the iodinated compound in case of the iodinated compound having a polymerizable double bond, bonded respectively to the said sequence at the terminal positions in such a manner that the said sequence intervenes between the said iodine atom and the said fragment.

The segmented polymer of the invention can be produced by (1) subjecting at least one monomer selected from Group (A) to radical polymerization in the presence of a radical producing source and an iodinated compound to give a pre-segmented polymer comprising a polymer segment constituted with the monomer(s) used in the radical polymerization and having a molecular weight of not less than 10,000, and an iodine atom liberated from the iodinated compound and a fragment of the iodinated compound excluding at least one iodine atom therefrom, the fragment comprising additionally any moieties originated from the said monomer(s) and from the iodinated compound in case of the iodinated compound having a polymerizable double bond, bonded respectively to the polymer segment at the terminal positions in such a manner that the polymer segment intervenes between the said iodine atom and the said fragment, and then (2) subjecting at least one monomer selected from Groups (A) and (B) to radical polymerization in the presence of a radical producing source and the pre-segmented polymer produced in the step (1) to give a bi-segmented polymer comprising a sequence of the polymer segment present in the pre-segmented polymer and a polymer segment constituted with the monomer(s) used in the radical polymerization and having a molecular weight of not less than 10,000, and an iodine atom liberated from the iodinated compound polymer and a fragment of the iodinated compound polymer excluding at least one iodine atom therefrom, the fragment comprising additionally any moieties originated from the said monomer(s) and from the pre-segmented polymer in case of the pre-segmented polymer having a polymerizable double bond, bonded respectively to the said sequence at the terminal positions in such a manner that the said sequence intervenes between the said iodine atom and the said fragment; optionally followed by (3) subjecting at least one monomer selected from the Groups (A) and (B) to radical polymerization in the presence of a radical producing source and the bi-segmented polymer produced in the step (2) to give a tri-segmented polymer comprising a sequence of the polymer segments present in the bi-segmented polymer and a polymer segment constituted with the monomer(s) used in the radical polymerization and having a molecular weight of not less than 10,000, and an iodine atom liberated from the iodinated compound and a fragment of the iodinated compound excluding at least one iodine atom therefrom, the fragment comprising additionally any moieties originated from the said monomer(s) and from the bi-segmented polymer in case of the bi-segmented polymer having a polymerizable double bond, bonded respectively to the said sequence at the terminal positions in such a manner that the said sequence intervenes between the said iodine atom and the said fragment; optionally followed by (4) subjecting at least one monomer selected from the Groups (A) and (B) to radical polymerization in the presence of a radical producing source and the tri-segmented polymer produced in the step (3) to give a tetra-segmented polymer comprising a sequence of the polymer segments present in the tri-segmented polymer and a polymer segment constituted with the monomer(s) used in the radical polymerization and having a molecular weight of not less than 10,000, and an iodine atom liberated from the iodinated compound and a fragment of the iodinated compound excluding at least one iodine atom therefrom, the fragment comprising additionally any moieties originated from the said monomer(s) and from the tri-segmented polymer in case of the tri-segmented polymer having a polymerizable double bond, bonded respectively to the said sequence at the terminal positions in such a manner that the said sequence intervenes between the said iodine atom and the said fragment; likewise optionally followed by one or more further step(s) for radical polymerization.

The iodinated compound usable in the step (1) is a perhalohydrocarbon of 1 to 16 carbon atoms, preferably of 1 to 8 carbon atoms, wherein at least one of the halogen atoms is an iodine atom but only one iodine atom is present on every two adjacent carbon atoms and the other halogen atoms consist of fluorine atoms or fluorine atoms and chlorine atoms but the number of chlorine atoms is not more than that of the fluorine atoms and only one chlorine atom is present on one carbon atom, and which may have an oxygen linkage (—O—) between any two carbon atoms and/or include additionally —CF$_2$H or =CF$_2$. The perhalohydrocarbon may be a straight, branched or cyclic one. The perhalohydrocarbon itself is usually saturated, but when a group of =CF$_2$ is present, it is unsaturated as the whole. The number of the iodine atoms in the perhalohydrocarbon is preferred to be 1 or 2, although no particular upper limitation is present. Such an unsaturated perhalohydrocarbon is per se polymerizable and participates in the radical polymerization. Thus, the unsaturated iodinated compound serves not only as the initiating agent of the radical polymerization but also as the monomer for formation of the polymer segment. Accordingly, its use may afford a segmented polymer having a somewhat complex structure.

Specific examples of the iodinated compound are monoiodoperfluoromethane, monoiodoperfluoroethane, monoiodoperfluoropropane, monoiodoperfluorobutane (e.g. 2-iodoperfluorobutane, 1-iodoperfluoro(1,1-dimethylethane)), monoiodoperfluoropentane, (e.g. 1-iodoperfluoro(4-methylbutane)), 1-iodoperfluoro-n-nonane, monoiodoperfluorocyclobutane, 2-iodoperfluoro(1-cyclobutyl)ethane, monoiodoperfluorocyclohexane, 2-iodo-1-hydroperfluoroethane, 3-iodo-1-hydroperfluoropropane, monoiodomonochlorodifluoromethane, monoiodomonodichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2-hydroperfluoropropane, monoiodotrifluoroethylene, 3-iodoperfluoropropene-1, 4-iodoperfluoropentene-1, 4-iodo-5-chloroperfluoropentene-1, 2-iodoperfluoro(1-cyclobutenyl)ethane, 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane, 1,7-diiodoperfluoro-n-octane, 1-iodoperfluorodecane, 1,12-diiodoperfluorododecane, 1,16-diiodoperfluorohexadecane, 1,2-di(iododifluoromethyl)perfluorocyclobutane, 2-iodo-2,2-dichloro-1,1,1-trifluoroethane, 2-iodoperfluoroethylperfluorovinyl ether, 2-iodoperfluoroethyl perfluoroisopropyl ether, etc.

As the monomers for the radical polymerization to make a polymer segment in each step, there may be employed those as selected from Groups (A) and (B). The Group (A) consists of fluorine-containing unsaturated polymerizable monomers of the formula: CF$_2$=CXY wherein X is a hydrogen atom or a fluorine atom and in case of X being a hydrogen atom, Y is a hydrogen atom and in case of X being a fluorine atom, Y is a hydrogen atom, a chlorine atom, a fluorine atom, a trifluoromethyl group, a difluoromethyl group, a perfluoroalkoxy group of 1 to 3 carbon atoms, a group of the formula: —(CF$_2$)$_m$COOM (in which m is an integer of 0 to 3 and M is hydrogen, sodium or potassium) or a group of the formula: —(OCF$_2$)$_p$—(OCF$_2$CF$_2$)$_q$—(OCF$_2$CF(CF$_3$))$_r$—Z (in which Z is —COF, —COOM, —SO$_2$F or —SO$_3$M, M being as defined above, and p, q and r are each an integer of 0 to 3 but at least one of them is not zero), and the Group (B) consists of unsaturated polymerizable monomers of 2 to 8 carbon atoms containing no fluorine atom.

Since, however, the use of any monomer selected from Group (B) makes it difficult further to carry out the radical polymerization for extending the sequence of polymer segments under ordinary reaction conditions after the radical polymerization once stops, such monomer should be employed only in the last step where any further extension of the sequence is not intended. In other words, for radical polymerization in any foregoing step prior to the last step, there should be used any monomer selected from Group (A), though such monomer may be also used alone or in combination with any monomer selected from Group (B) for the radical polymerization in the last step. In each step, one or more monomers may be used. When only one monomer is used, the resulting polymer segment is a homopolymer segment, and when two or more monomers are used, the formed polymer segment is a copolymer. The choice of a suitable monomer(s) may be done so as to form a polymer segment different from the polymer segments in the just foregoing and subsequent steps in steric configuration or monomeric composition.

Specific examples of the monomers in Group (A) are tetrafluoroethylene, trifluoroethylene, vinylidene fluoride, chlorotrifluoroethylene, hexafluoropropylene, pentafluoropropylene, perfluoro(methyl vinyl ether), perfluoro(ethyl vinyl ether), perfluoro(propyl vinyl ether), perfluoroacrylic acid, perfluorovinylacetic acid, perfluoro(3-vinyloxypropionic acid), perfluoro[2-(2-fluorosulfonylethoxy)propyl vinyl ether], etc.

Specific examples of the monomers in Group (B) are ethylene, propylene, butene, vinyl esters (e.g. vinyl acetate), vinyl ethers (e.g. methyl vinyl ether), acrylic acid, methacrylic acid, alkyl acrylates (e.g. methyl acrylate, ethyl acrylate), butyl acrylate), alkyl methacrylates (e.g. methyl methacrylate, ethyl methacrylate), etc.

As the radical producing source, any source as conventionally employed for the same purpose may be used. Preferred are light and heat, since those can accomplish the selective cleavage of the I—C bond in the iodinated compound. As the light, there may be employed any light from the infrared region to the ultraviolet region. Chemical ultraviolet rays may be used but are sometimes unfavorable in producing radicals not only from the I—C bond but also from any other bond. A similar drawback may be observed when ionic irradiation is adopted. When the radical polymerization is initiated by heat alone, heating to 200° C. or higher is preferred.

Other radical producing sources are conventional radical initiators which do not substantially act as a chain transfer agent and can show an appropriate decomposition rate under the reaction conditions for the radical polymerization. Examples of such radical initiators are organic or inorganic peroxides or azo compounds, organic metallic compounds, metals, etc. Among them, organic metallic compounds are usually not preferred, because those draw not only an iodine atom but also any other atom or group to produce radicals. Particularly recommendable are persulfates, hydrogen peroxide, $(RfCO)_2O_2$, RfOORf, RfC(O)OORf, $(Rf)_3COOC(O)OC(Rf)_3$, $N_2F_2$, Rf—N=N—Rf, $HgRf_2$, Li, K, Na, Mg, Zn, Hg, Al, etc. (Rf being a perfluoroalkyl group). The concentration of these radical initiators in the reaction system is preferred to be kept as low as possible so as to suppress the stoppage caused by the bonding between radicals and to preferentially proceed with the chain extending reaction.

The proportion of the iodinated compound and the monomer(s) to be polymerized in the radical polymerization may be appropriately decided so as to make a polymer segment having a desired molecular weight. In such case, the chain transfer constant of the iodinated compound may be taken as an indication. When, for instance, the chain transfer constant of the iodinated compound is relatively large, its substantial portion is bonded to the polymer segment at the initial stage of the radical polymerization, and the reaction can be accomplished smoothly without any particular care. When the chain transfer constant is relatively small, an excessive amount of the iodinated compound may be initially used and, after a polymer segment of relatively small molecular weight is produced under such condition, the unreacted iodinated compound is eliminated, followed by continuation of further polymerization until a desired molecular weight is obtained. In order to produce a polymer segment having a narrow molecular weight distribution, such sequential polymerization is usually effective.

The temperature for the radical polymerization is not limitative insofar as the reaction can proceed and the thermal decomposition of the produced polymer chain does not occur, and it is usually from −20° to 150° C. When, however, heat is used as the radical producing source, a higher temperature such as 250° C. may be necessitated.

The pressure on the radical polymerization is not limitative, and there is normally adopted an autogenic pressure caused by the monomer(s) participating in the radical polymerization or less. When, however, the chain extending reaction takes place only under a high pressure, for instance, as seen in the production of hexafluoropropylene homopolymer or hexafluoropropylene/tetrafluoroethylene copolymer having a large amount of hexafluoropropylene content by polymerization of hexafluoropropylene or its mixture with tetrafluoroethylene, a pressure of several thousands atm. may be required. On the other hand, in case of the monomer being non-volatile under the reaction conditions for the radical polymerization, no pressurization is materially needed.

The radical polymerization may be carried out in any conventional procedure such as bulk polymerization, solution polymerization, suspension polymerization or emulsion polymerization. The same procedure may be adopted through all the steps, or different procedures may be adopted for different steps. From the viewpoint of the uniformity of the reaction system, emulsion polymerization is usually the most preferred. Next is solution polymerization or suspension polymerization in the presence of a solvent substantially inert to the radical attack. Examples of the solvent are perfluoro(dimethylcyclobutane), perfluorocyclohexane, dichlorotetrafluoroethane, trichlorotrifluoropropane, polyfluoroalkanes, perfluoro(ethylene glycol methyl ethyl ether), etc.

In case of emulsion polymerization, the use of an emulsifier is usually preferred. When, however, the polymer segment as produced has a surface active effect, for instance, due to the presence of a hydrophilic group such as —COOM', —OH or —SO$_3$M' (M' being a cation such as hydrogen, sodium or potassium) therein, the use of the emulsifier may be sometimes omitted. Examples of the emulsifier are salts of fluorine-containing carboxylic acids, salts of fluorine-containing sulfonic acids, etc. The addition of the emulsifier to the reaction system may be effected all at once at the initial stage or any early stage. Alternatively, it may be effected continuously or intermittently. In general, the emulsifier may be used in a concentration of not more than 5% by weight to the weight of the reaction system. The presence of an excessive amount of the emulsifier should be avoided. In addition to the emulsifier, any emulsion stabilizer may be employed if desired.

The segmented polymer produced by the process as above illustrated has an iodine atom at the terminal position. This terminal iodine atom may be replaced by any other atom or substituent for stabilization or activation. For instance, it may be substituted with hydrogen, fluorine, chlorine, bromine, alkyl, thioalkyl, silyl, fluorine-containing alkyl or the like by the reaction with a compound having such atom or group. Further, for instance, any compound having an unsaturated bond (e.g. allyl alcohol, α-methylstyrene, diallyl phthalate, tetraallyl pyromellitate) may be added thereto.

The segmented polymer of this invention possesses various notable and characteristic properties depending on the composition and steric configuration of the sequence of the polymer segments. Some typical examples are as follows:

The segmented polymer, wherein the sequence of polymer segments consists of (a) a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, and (b) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, the weight proportion of the polymer segment (a) and the polymer segment (b) being 5–60:40–95, has a thermoelastic rubbery property;

The segmented polymer, wherein the sequence consists of (a) a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, (b) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, and (a') a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, the weight proportion of the polymer segments (a) and (a') and the polymer segment (b) being 5–60:40–95, has also a thermoelastic rubbery property;

The segmented polymer, wherein the sequence consists of (a) a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, and (b) a polymer segment having a molecular weight of 30,000–600,000 and constituted with the units of vinylidene fluoride, hexafluoropropylene or pentafluoropropylene and tetrafluoroethylene in a molar ratio of 45–90:5–50:0–35 or of perfluoro(methylvinyl ether), perfluoro(ethylvinyl ether) or perfluoro(propylvinyl ether), tetrafluoroethylene and vinylidene fluoride in a molar ratio of 15–75:0–85:0–85, the weight proportion of the polymer segment (a) and the polymer segment (b) being 40–60:40–60, has an improved brittleness;

The segmented polymer, wherein the sequence consists of (a) a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, (b) a polymer segment having a molecular weight of 30,000–600,000 and constituted with the units of vinylidene fluoride, hexafluoropropylene or pentafluoropropylene and tetrafluoroethylene in a molar ratio of 45–90:5–50:0–35 or of perfluoro(methylvinyl ether), perfluoro(ethylvinyl ether) or perfluoro(propylvinyl ether), tetrafluoroethylene and vinylidene fluoride in a molar ratio of 15–75:0–85:0–85, and (a') a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, the weight proportion of the polymer segments (a) and (a') and the polymer segment (b) being 40–60:40–60, has also an improved brittleness;

The segmented polymer, wherein the sequence consists of (a) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, and (b) a polymer segment having a molecular weight of 30,000 to 10,000,000 and constituted with the units of tetrafluoroethylene and vinylidene fluoride in a molar ratio of 30–100:0–70, the weight proportion of the polymer segment (a) and the polymer segment (b) being 5–90:10–95, is provided with properties suitable for formation of sheets, films and filaments;

The segmented polymer, wherein the sequence consists of (a) a polymer segment having a molecular weight of 30,000 to 1,200,000 and constituted with the units of vinylidene fluoride, hexafluoropropylene or pentafluoropropylene and tetrafliuoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, (b) a polymer segment having a molecular weight of 30,000 to 10,000,000 and constituted with the units of tetrafluoroethylene and vinylidene fluoride in a molar ratio of 30–100:0–70, and (a') a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, the weight proportion of the polymer segments (a) and (a') and the polymer segment (b) being 5–90:10–95, is also provided with properties suitable for formation of sheets, films and filaments;

The segmented polymer, wherein the sequence consists of (b) a polymer segment having a molecular weight of 30,000 to 10,000,000 and constituted with the Practical embodiments of the present invention are illustratively shown in the following examples wherein % is by weight unless otherwise indicated, and the molecular weight represents an average one (including the foregoing descriptions). The abbreviations have the following meaings: R-113, trichlorotrifluoroethane; HFP, hexafluoropropylene; VdF, vinylidene fluoride; TFE, tetrafluoroethylene; MMA, methyl methacrylate; 6FI, perfluoroisopropyl iodide; PTFE, polytetrafluoroethylene; PVdF, polyvinylidene fluoride; PMMA, polymethyl methacrylate, etc.

REFERENCE EXAMPLE 1

In a 3000 ml volume autoclave flushed with HFP, R-113 (1100 ml) and 6FI (10 ml) were charged, and HFP (600 g) was added thereto. VdF was introduced into the autoclave at 18° C. to make a pressure of 2.5 kg/cm$^2$G, and a solution of 3,5,6-trichloroperfluorohexanoyl peroxide (1.8 g) in R-113 (5 ml) was added thereto. After 8 hours, the pressure lowered to 1.8 kg/cm$^2$G, and the gas was released. Evaporation of R-113 from the reaction mixture (transparent liquid) gave as a transparent rubbery material a pre-segmented polymer comprising a polymer segment of HFP/VdF (56:44 in molar ratio).

In the IR absorption spectrum, absorptions were observed at 920 (attributable to —CH$_2$CF$_2$I) and 700 cm$^{-1}$ (attributable to (CF$_3$)$_2$CF—). When the pre-segmented polymer was irradiated with ultraviolet rays, the absorption at 920 cm$^{-1}$ disappeared and an absorption was produced at 1750 cm$^{-1}$ (attributable to —CH=CF$_2$). No change was observed on the absorption at 700 cm$^{-1}$. Continuation of the irradiation in the air for a long period of time resulted in the disappearance of the once produced absorption at 1750 cm$^{-1}$. However, the irradiation in a nitrogen atmosphere did not result in the disappearance of such absorption. When the said reaction mixture comprising the pre-segmented polymer was with diisopropyl peroxydicarbonate at 40° C., the absorption at 920 cm$^{-1}$ disappeared.

REFERENCE EXAMPLE 2

In a 35 liter volume autoclave, demineralized water (15 kg) and ammonium perfluorooctanoate (0.075 kg) were charged, and the atmosphere was substituted with HFP under stirring. A mixture of HFP and VdF (55:45 in molar ratio) was introduced into the autoclave at 80° C. to make a pressure of 12 kg/cm$^2$G, and at the same time 6FI (0.024 kg) was added thereto. Then, a solution of ammonium persulfate (0.01 kg) in demineralized water (0.05 kg) was added to the autoclave, whereby polymerization took place immediately. The polymerization was continued with the occasional supply of a mixture of HFP and VdF (21:79 in molar ratio) for maintaining the initial pressure. After 5 hours, the gas was released, and the reaction mixture (white aqueous dispersion) was frozen. The coagulated product was washed with water to afford a pre-segmented polymer comprising a polymer segment of HFP/VdF (20:80 in molar ratio) and having an iodine content of 0.38% by weight. In the IR absorption spectrum, an absorption at 920 cm$^{-1}$ was not seen owing to the influence of other absorptions.

COMPARATIVE EXAMPLE 1

Into a 3000 ml volume autoclave, azobisisobutyronitrile (40 g) was charged, and the atmosphere was substituted with chlorotrifluoroethylene gas. Bromotrichloromethane (1210 g) was added to the autoclave, and chlorotrifluoroethylene gas was introduced therein at 80° C. under stirring to make a pressure of 6 kg/cm$^2$G. Then, polymerization was carried out at 80° to 85° C. for 4.5 hours under a pressure of 5 to 6 kg/cm$^2$G. After cooling, the gas was released, and the resulting liquid product (1640 g) was distilled to obtain the following fractions:

| | |
|---|---|
| Fraction at 55° C./110 mmHg - 60° C./70 mmHg (mainly CBrCl$_3$) | 880 g |
| Fraction at 75° C./4 mmHg (mainly CCl$_3$CF$_2$CFClBr) | 280 g |
| Fraction at 75 - 95° C./4 mmHg (mainly CCl$_3$(CF$_2$CFCl)$_2$Br) | 153 g |
| Fraction at 115° C./4 mmHg - 125° C./2 mmHg (mainly CCl$_3$(CF$_2$CFCl)$_3$Br) | 110 g |
| High boiling point components | as residue |

Into a 150 ml volume glass made reaction vessel, the above obtained CCl$_3$CF$_2$CFClBr (50 ml) and azobisisobutyronitrile (3 g) were charged, and the atmosphere was substituted with chlorotrifluoroethylene gas at 80° C. to make a pressure of 6 kg/cm$^2$G. No depression of the pressure occurred. Then, the temperature was raised to 90° C. and the pressure was elevated to 10 kg/cm$^2$G, but no depression of the pressure occurred. Even when a dispersion of azobisisobutyronitrile (2 g) in CCl$_3$CF$_2$CFClBr was added, any depression of the pressure was not observed. The contents of the reaction vessel were taken out and subjected to distillation, whereby their greater portion was proved to be CCl$_3$CF$_2$CFClBr.

EXAMPLE 1

The reaction mixture comprising the pre-segmented polymer as obtained in Reference Example 1 (20 ml) was heated under reflux for 2 hours. The heated solution and 3,5,6-trichloroperfluorohexanoyl peroxide (0.05 g) were charged in a 100 ml volume glass made reaction vessel, and TFE, VdF or ethylene was introduced therein at room temperature to make a pressure of 2 kg/cm$^2$G, 5 kg/cm$^2$G or 20 kg/cm$^2$G. Then, the reaction vessel was allowed to stand at room temperature. In case of ethylene, no substantial depression of the pressure was observed, while in case of TFE or VdF, the depression of 0.5 kg/cm$^2$G occurred within 30 minutes. After completion of the reaction, the gas was released. The contents were taken out and filtered to separate into a solid product and a filtrate. The solid product was washed with R-113 and cold acetone in order.

When TFE was used as the monomer, the solid product was proved to mainly consist of the units of TFE by the IR absorption spectrum, wherein the absorptions due to the pre-segmented polymer were also observed with disappearance of the one at 920 cm$^{-1}$. A quite similar IR absorption spectrum was shown by the non-extractable portion resulting from the extraction of the solid product with acetone for 18 hours by the aid of a Soxhlet's extractor. The solid material obtained by evaporation of the filtrate was a whitish rubber. The IR absorption spectrum of a film prepared from this rubber with acetone was quite similar to that of the pre-segmented polymer, though an absorption based on the chain of –(CF$_2$)$_n$– was barely observed and the absorption at 920 cm$^{-1}$ was extinguished.

units of tetrafluoroethylene and vinylidene fluoride in a molar ratio of 30–100:0–70, (a) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, and (b') a polymer segment having a molecular weight of 30,000 to 10,000,000 and constituted with the units of tetrafluoroethylene and vinylidene fluoride in a molar ratio of 30–100; 0–70, the weight proportion of the polymer segment (a) and the polymer segments (b) and (b') being 5–90:10–95, is also provided with properties suitable for formation of sheets, films and filaments;

The segmented polymer, wherein the sequence consists of (a) a polymer segment having a molecular weight of 30,000 to 1,200,000 and constituted with the units of vinylidene fluoride, hexafluoropropylene and tetrafluoroethylene in a molar ratio of 0–100:0–50:0–100, and (b) a polymer segment having a molecular weight of 10,000 to 100,000 and constituted with the units of methyl methacrylate and one or more other monomer(s) copolymerizable therewith in a molar ratio of 50–100:0–50, of styrene and one or more other monomer(s) copolymerizable therewith in a molar ratio of 50–100:0–50 or of vinyl chloride and one or more other monomer(s) copolymerizable therewith in a molar ratio of 50–100:0–50, the weight proportion of the polymer segment (a) and the polymer segment (b) being 10–95:5–90, is provided with properties suitable for manufacture of coating compositions;

The segmented polymer, wherein the sequence consists of (a) a polymer segment having a molecular weight of 30,000 to 1,200,000 and constituted with the units of vinylidene fluoride, hexafluoropropylene and tetrafluoroethylene in a molar ratio of 0–100:0–50:0–100, (b) a polymer segment having a molecular weight of 10,000 to 100,000 and constituted with the units of methyl methacrylate and one or more other monomer(s) copolymerizable therewith in a molar ratio of 50–100:0–50, of styrene and one or more other monomer(s) copolymerizable therewith in a molar ratio of 50–100:0–50 or of vinyl chloride and one or more other monomer(s) copolymerizable therewith in a molar ratio of 50–100:0–50, and (a') a polymer segment having a molecular weight of 30,000 to 1,200,000 and constituted with the units of vinylidene fluoride, hexafluoropropylene and tetrafluoroethylene in a molar ratio of 0–100:0–50:0–100, the weight proportion of the polymer segments (a) and (a') and the polymer segment (b) being 10–95:5–90, is also provided with properties suitable for manufacture of coating compositions;

The segmented polymer, wherein the sequence consists of (b) a polymer segment having a molecular weight of 10,000 to 100,000 and constituted with the units of methyl methacrylate and one or more other monomer(s) copolymerizable therewith in a molar ratio of 50–100:0–50, of styrene and one or more other monomer(s) copolymerizable therewith in a molar ratio of 50–100:0–50 or of vinyl chloride and one or more other monomer(s) copolymerizable therewith in a molar ratio of 50–100:0–50, (a) a polymer segment having a molecular weight of 30,000 to 1,200,000 and constituted with the units of vinylidene fluoride, hexafluoropropylene and tetrafluoroethylene in a molar ratio of 0–100:0–50:0–100, and (b') a polymer segment having a molecular weight of 10,000 to 100,000 and constituted with the units of methyl methacrylate and one or more other monomer(s) copolymerizable therewith in a molar ratio of 50–100:0–50, of styrene and one or more other monomer(s) copolymerizable therewith in a molar ratio of 50–100:0–50 or of vinyl chloride and one or more other monomer(s) copolymerizable therewith in a molar ratio of 50–100:0–50, the weight proportion of the polymer segment (a) and the polymer segments (b) and (b') being 10–95:5–90, is also provided with properties suitable for manufacture of coating compositions;

The segmented polymer, wherein (a) a polymer segment having a molecular weight of 30,000 to 1,200,000 and constituted with the units of $CF_2=CF(CF_2)_{0-3}COOH$, vinylidene fluoride and tetrafluoroethylene in a molar ratio of 5–50:0–95:0–95 or of $CF_2=CFO(CF_2)_2COOH$ and tetrafluoroethylene in a molar ratio of 5–50:50–95, and (b) a polymer segment having a molecular weight of 30,000 to 10,000,000 and constituted with the units of vinylidene fluoride, tetrafluoroethylene and hexafluoropropylene in a molar ratio of 0–100:0–100:0–50 or of ethylene, tetrafluoroethylene or hexafluoropropylene in a molar ratio of 40–60:15–50:0–35, the weight proportion of the polymer segment (a) and the polymer segment (b) being 20–95:5–80, is hydrophilic and reinforced;

The segmented polymer, wherein (a) a polymer segment having a molecular weight of 30,000 to 1,200,000 and constituted with the units of $CF_2=CF(CF_2)_{0-3}COOH$, vinylidene fluoride and tetrafluoroethylene in a molar ratio of 5–50:0–95:0–95 or of $CF_2=CFO(CF_2)_2COOH$ and tetrafluoroethylene in a molar ratio of 5–50:50–95, (b) a polymer segment having a molecular weight of 30,000 to 10,000,000 and constituted with the units of vinylidene fluoride, tetrafluoroethylene and hexafluoropropylene in a molar ratio of 0–100:0–100:0–50 or of ethylene, tetrafluoroethylene or hexafluoropropylene in a molar ratio of 40–60:15–50:0–35, and (a') a polymer segment having a molecular weight of 30,000 to 1,200,000 and constituted with the units of $CF_2=CF(CF_2)_{0-3}COOH$, vinylidene fluoride and tetrafluoroethylene in a molar ratio of 5–50:0–95:0–95 or of $CF_2=CFO(CF_2)_2COOH$ and tetrafluoroethylene in a molar ratio of 5–50:50–95, the weight proportion of the polymer segments (a) and (a') and the polymer segment (b) being 20–95:5–80, is also hydrophilic and reinforced;

The segmented polymer, wherein (b) a polymer segment having a molecular weight of 30,000 to 10,000,000 and constituted with the units of vinylidene fluoride, tetrafluoroethylene and hexafluoropropylene in a molar ratio of 0–100:0–100:0–50 or of ethylene, tetrafluoroethylene or hexafluoropropylene in a molar ratio of 40–60:15–50:0–35, (a) a polymer segment having a molecular weight of 30,000 to 1,200,000 and constituted with the units of $CF_2=CF(CF_2)_{0-3}COOH$, vinylidene fluoride and tetrafluoroethylene in a molar ratio of 5–50:0–95:0–95 or of $CF_2=CFO(CF_2)_2COOH$ and tetrafluoroethylene in a molar ratio of 5–50:50–95, and (b') a polymer segment having a molecular weight of 30,000 to 10,000,000 and constituted with the units of vinylidene fluoride, tetrafluoroethylene and hexafluoropropylene in a molar ratio of 0–100:0–100:0–50 or of ethylene, tetrafluoroethylene or hexafluoropropylene in a molar ratio of 40–60:15–50:0–35, the weight proportion of the polymer segment (a) and the polymer segments (b) and (b') being 20–95:5–80, is hydrophilic and reinforced, etc.

When VdF was used as the monomer, the obtained solid product substantially consisted of the units of VdF and had a low content of rubber. The rubber obtained from the filtrate showed a lessened absorption at 920 cm$^{-1}$ in the IR absorption spectrum. In addition to the absorptions based on the units of VdF, there were present other absorptions at 950 cm$^{-1}$ and 1040 cm$^{-1}$ which disappeared by ultraviolet ray-irradiation.

When ethylene was employed as the monomer, the solid product and the rubber from the filtrate showed similar IR absorption spectra wherein absorptions mainly due to the pre-segmented polymer and strong absorptions at 2850 and 2900 cm$^{-1}$ were observed. The absorption at 920 cm$^{-1}$ was completely extinguished. Further, an absorption was barely observed at 970 cm$^{-1}$ which disappeared by ultraviolet ray-irradiation.

EXAMPLE 2

In a 1000 ml volume glass made reaction vessel, the reaction mixture comprising the pre-segmented polymer as obtained in Reference Example 2 (300 ml) was charged, and the atmosphere was substituted with a gaseous monomer(s) to make a pressure as shown in Table 1 at 25° C. Ultraviolet rays were irradiated thereto by the aid of a high pressure mercury lamp (400 W) at a distance of 10 cm from the bottom of the reaction vessel, whereby the reaction started. At each reduction of pressure of 1 kg/cm$^2$G, the gaseous monomer(s) were supplied to the reaction system to recover the initial composition and pressure. This procedure was taken as one cycle. The reaction velocity and the monomeric composition in the produced segmented polymer were determined. The results are shown in Table 1.

Further, in the above Example, with the use of 6FI, water and ammonium persulfate in place of the reaction mixture comprising the pre-segmented polymer as obtained in Reference Example 2, the reaction does not substantially proceed. The use of the similar reaction mixture but comprising a pre-segmented polymer not bearing an iodine atom at the terminal position shows an extremely slow reaction rate.

EXAMPLE 3

In a 3000 ml volume autoclave, the reaction mixture comprising the pre-segmented polymer as obtained in Reference Example 2 (200 ml) and demineralized water (800 ml) were charged, and after substitution of the atmosphere with nitrogen gas, the contents were heated at 95° C. for 40 minutes. Then, the nitrogen gas was eliminated, and a gaseous monomer(s) was introduced into the autoclave to make a pressure as shown in Table 2 at 70° C. A 0.5% aqueous solution of ammonium persulfate (6 ml) was added to the reaction vessel while stirring, whereby polymerization started immediately. The polymerization was continued while introducing the gaseous monomer(s) therein so as to maintain the initial pressure. When the weight proportion of the polymer segment derived from the monomer(s) to the total product reached the value as shown in Table 2, the temperature was lowered, and the monomer(s) was released to stop the reaction. The reaction mixture (white aqueous dispersion) was frozen, and the coagulated product was collected, washed with water and dried to give a segmented polymer. In the aqueous phase, from which the segmented polymer was separated, iodide ion was not substantially detected. The segmented polymer was extracted with acetone by the Table 1

| Monomer(s) (Molar ratio)*[1] | TFE | VdF | TFE/CH$_2$=CH$_2$ (90/10) | TFE/HFP (50/50) | HFP/VdF (55/45) |
|---|---|---|---|---|---|
| Pressure (kg/cm$^2$G) | 4–5 | 9–10 | 9–10 | 8–9 | 10–11 |
| Minutes/cycle | 80 | 169 | 123 | 65 | 303 |
| Ratio of reaction velocity (taking reaction velocity in case of TFE as 1) | 1 | 0.22 | 0.31 | 0.65 | 0.13 |
| Monomeric composition in produced segment polymer (Molar ratio) | — | — | 55/45 | 96/4 | 21/79 |

Note:
*[1]The molar ratio of the monomers in the reaction vessel is indicated. The composition of the supplied monomers corresponds to that of the monomeric composition in the produced segmented polymer.

In the above Example, the reaction velocity is proportional to the square root of the intensity of ultraviolet rays to be irradiated. Within a range of 20° to 60° C., the relationship between the reaction velocity and the temperature satisfies the Arrhenius' equation with an activation energy of 3 to 6 Kcal/mol.

use of a Soxhlet's extractor for 18 hours to separate into an extractable portion and a non-extractable portion. The weight proportion of the non-extractable portion and the iodine contents of the extractable portion and of the non-extractable portion were determined. The results are shown in Table 2.

Table 2

| Monomer(s) (Molar ratio)*[1] | TFE | VdF | TFE/HFP (50/50) | TFE/CH$_2$=CH$_2$ (90/10) | TFE/CF$_3$OCF=CF$_2$ (50/50) |
|---|---|---|---|---|---|
| Pressure (kg/cm$^2$G) | 4–5 | 20–22 | 7–8 | 12–13 | 12–14 |
| Minutes/cycle | 60 | 20 | 70 | 75 | 48 |
| Ratio of reaction velocity (taking reaction velocity in case of TFE as 1) | 1 | 0.75 | 0.56 | 0.33 | 0.49 |
| Proportion of polymer | 64 | 44 | 36  58  76*[2] | 24  66 | 58 |

Table 2-continued

| Monomer(s) (Molar ratio)*1 | TFE | VdF | TFE/HFP (50/50) | TFE/CH$_2$=CH$_2$ (90/10) | TFE/CF$_3$OCF=CF$_2$ (50/50) |
|---|---|---|---|---|---|
| segment derived from monomer(s) to total polymer (%) | | | | | |
| Proportion of non-extractable portion to segmented polymer (%) | 76 | 0 | 49  78  92 | 81  96 | — |
| Iodine content of non-extractable portion (%) | 0.07 | — | 0.16  0.11  0.083 | 0.29  0.17 | — |
| Iodine content of extractable portion (%) | 0.39 | (0.26)*3 | 0.38  0.34  0.27 | 0.26  0.06 | (0.16)*3 |
| Monomeric composition in polymer segment derived from monomer(s) (molar ratio) | — | — | 96/4 | 55/45 | 65/35 |

Note:
*1 The molar ratio of the monomers in the reaction vessel is indicated. The composition of the supplied monomers corresponds to that of the monomeric composition in the polymer segment derived therefrom in the produced segmented polymer.
*2 The product was in a coagulated state.
*3 Iodine content in the total product.

When the segmented polymer having a polymer segment of TFE is pressed by the use of rolls at a temperature of from room temperature to about 200° C., there can be obtained a film or sheet of soft quality, which is transparent and has an elongation of not more than 100% and a tensile strength of not less than 500 kg/cm$^2$. Such property is possessed not only by the one as obtained in the above Example but also by the one having the polymer segment of TFE in a content of from several % to 90% or more. The segmented polymer having the polymer segment of TFE in a higher content usually requires a higher temperature for its press molding. The said property is particularly notable in the segmented polymer wherein the polymer segment of TFE has a melting point of not less than about 320° C. in the differential thermal analysis with a temperature elevation rate of 10° C./min or the polymer segment of HFP/VdF has an intrinsic viscosity [$\eta$] of not less than 0.2 (35° C., dl/g, methylethylketone). The tensile strength of the segmented polymer is larger when the molecular weight(s) of the said polymer segment(s) are higher. Further, the use of a polyiodide or an unsaturated iodide as the iodinated compound in the preparation of the pre-segmented polymer can afford a segmented polymer being more excellent in the said property.

On the manufacture of the film or sheet as stated above, the segmented polymer may include the pre-segmented polymer as unreacted or be blended with any other rubbery material, and such inclusion or blending is sometimes favorable because of easy press molding. The contamination with a small amount of PTFE itself does not cause any serious deterioration in the said property of the segmented polymer.

The thus prepared film or sheet does not have any residual stress and does not produce any shrinkage on heating at a temperature, for instance, of about 327° C. or higher.

In the X ray diffraction pattern of the said film or sheet, a relatively broad peak having a maximum value at a diffraction angle of $2\theta = 17.7°$ is sometimes observed. This is apparently different from a sharp peak at a diffractive angle of $2\theta = 18.1°$ as seen in case of a PTFE film or sheet. In the IR spectrum of the said film or sheet, absorptions are sometimes observed at 2850 and 2920 cm$^{-1}$, which are not seen in case of the segmented polymer itself. Such absorptions are probably due to the structure of

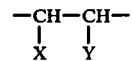

(wherein X and Y are each a fluorine-containing alkyl group), which may be produced by the re-combination of the radicals formed from the cleavage of the molecule.

The said property is not seen in the product obtained by a dispersion blending method wherein a HFP/VdF rubbery copolymer and an aqueous dispersion of PTFE are mixed together and then coagulated or a polymerization method wherein TFE is polymerized in the presence of a HFP/VdF rubbery copolymer having no iodine atom at the terminal position.

The film or sheet as above mentioned is useful as gaskets, membranes, packaging materials, building materials, etc.

The segmented polymer having a polymer segment of VdF can afford a film or sheet which is considerably softer than a film or sheet of PVdF itself when compression molded at about 200° C. The segmented polymer can be dissolved in hot acetone to afford a uniform solution, which maintains the solution state even when cooled to room temperature and gives a transparent film when applied onto a glass plate. From the IR absorption spectrum of the film, it is revealed that the polymer segment of VdF is crystallized in a $\beta$-form. Such $\beta$-form crystallization is also proved from the X ray diffraction pattern, since a single peak is given at a diffraction angle of $2\theta = 18°$. A coating composition may be formulated by the use of the segmented polymer, for instance, by dissolving the segment polymer into acetone to make a 10% solution, admixing the solution with titanium oxide in a weight proportion of 10:1 and shaking the resulting mixture with hard glass beads. The thus prepared composition is applied onto a steel plate by the aid of a brush and dried to form a white coating film. The formed film adheres firmly onto the surface of the steel plate and does not produce any material change in property even after being allowed to stand outdoors for a period of about 10 months. Thus, the segmented polymer is useful as a resinous material for coating compositions.

The segmented polymer having a polymer segment of TFE/HFP can be readily molded into a film, for instance, by the use of a hot plate of about 340° C. when it comprises a HFP/VdF polymer segment in a content of 20 to 30% by weight as the constituent. Such segmented polymer is usually not more than about 100,000 in molecular weight. It is notable that the said film is very tough, while a film made of a TFE/HFP copolymer having the substantially same composition and molecular weight as above is readily breakable by bending. Still, the said film can be easily bonded onto a HFP/VdF copolymer sheet by pressing with a hot plate. The segmented polymer prepared in the above Example is resistant to heating of up to 350° C. A higher temperature causes thermal decomposition and results in discoloration. When, however, the content of HFP in the polymer segment is 40 mol % or more, deterioration somewhat occurs but no coloring is observed. In the differential thermal analysis with a temperature elevation speed of 10° C./min, the melting of the polymer segment of TFE/HFP in the segmented polymer occurs at 290° to 310° C.

The segmented polymer having a polymer segment of $TFE/CF_3OCF=CF_2$ is a rubbery material soluble in acetone, perfluorodimethylcyclobutane, etc. It can be vulcanized by the use of an appropriate vulcanizing agent such as hexamethylenediamine carbamate.

EXAMPLE 4

Into a 1000 ml volume glass made reaction vessel, the reaction mixture comprising the pre-segmented polymer as obtained in Reference Example 2 (100 ml) and demineralized water (200 ml) were charged, and the atmosphere was substituted with nitrogen gas to make a pressure of 0.5 kg/cm$^2$G and heated to 70° C. MMA (10 ml) was introduced into the reaction vessel, and a solution of ammonium persulfate (20 mg) in demineralized water (20 ml) was added thereto, whereby polymerization started. With the progress of the polymerization, MMA was extinguished gradually, and the turbidity of the reaction mixture was increased. After the complete consumption of MMA, which took about 3 hours, the reaction mixture was allowed to stand for an additional 5 hours and then cooled rapidly so as to stop the polymerization. The resulting dispersion was extremely stable, and no deposition was observed even after 6 months. The said dispersion was frozen, and the coagulated product was collected, washed with water and dried at 40° C. under reduced pressure to give a segmented polymer as a powder. Drying at 70° C. gave a hard block. The segmented polymer had a polymer segment of MMA in a content of 37% by weight and could be dissolved in a solvent such as chloroform or toluene to give a uniform solution. When the solution was applied onto the surface of a substrate such as a glass plate or a metal plate, there was formed a film having a good adhesion to the said surface. Therefore, the segmented polymer is usable as a resinous material for coating compositions. When the proportion of the polymer segment of MMA in the segmented polymer was not more than 20% by weight, the segmented polymer was soluble in acetone, ethyl acetate, etc. but was insoluble in chloroform, toluene, etc.

The use of any other monomer(s) in place of MMA in the above Example can afford a segmented polymer which is usable as a resinous material for production of coating compositions of solvent type or emulsion type.

COMPARATIVE EXAMPLE 2

In the same manner as in Reference Example 2 but not using 6FI, there was obtained a dispersion comprising a HFP/VdF copolymer. In the presence of such dispersion, MMA was polymerized under the same reaction conditions as in Example 4. The reaction mixture was frozen to coagulate the produced polymer. The polymer was completely soluble in acetone, ethyl acetate, etc., but the rubbery component remained when the solvent was chloroform, toluene or the like. This behavior is entirely the same as that of a polymer blend obtained by admixing a HFP/VdF copolymer dispersion with a dispersion of PMMA and coagulating the polymer components.

EXAMPLE 5

In the same manner as in Example 4, there was prepared a segmented polymer comprising polymer segments of HFP/VdF and of styrene. The segmented polymer having a styrene content of 44% by weight could be dissolved in chloroform to afford a turbid solution but not completely dissolved in acetone a slight amount of insoluble materials remaining therein. Such solution could give a film when applied onto a substrate. The segmented polymer having a styrene content of 15% by weight could be completely dissolved in acetone but not materially in chloroform.

The segmented polymer having a styrene content of 44% by weight was pressed by the aid of rolls to make a transparent sheet of soft quality, which was heated to give a semi-transparent sheet of hard quality. The said soft quality sheet was immersed in acetone, allowed to stand for a while and heated at 100° C., whereby a transparent sheet of hard quality was obtained.

EXAMPLE 6

Into a 1000 ml volume glass made reaction vessel, the reaction mixture comprising the pre-segmented polymer as obtained in Reference Example 2 (100 ml) and demineralized water (200 ml) were charged, and the atmosphere was substituted with vinyl chloride to make a pressure of 3 kg/cm$^2$G at 70° C. A 0.2% aqueous solution of ammonium persulfate (10 ml) was added to the reaction vessel, whereby polymerization started immediately. The polymerization was continued for 7 hours with an occasional supply of vinyl chloride so as to maintain a pressure of 2.5 to 3.0 kg/cm$^2$G. The consumed amount of vinyl chloride until the completion of the polymerization was 4.7 g. The reaction mixture (white aqueous dispersion) was frozen, and the coagulated product was collected, washed with water and dried to give a segmented polymer as powder. The segmented polymer was soluble in acetone. When pressed by the aid of rolls, the resulting sheet showed the same property as possessed by the segmented polymer as obtained in Example 5.

EXAMPLE 7

Into a 3000 ml volume autoclave, water (1000 ml), ammonium perfluorooctanoate (2.3 g) and n-paraffin wax (50 g) were charged, and the atmosphere was substituted with TFE to make a pressure of 5 kg/cm$^2$G at 80° C. 6FI (1 ml) was added to the autoclave and stirred for 30 minutes. Then, a 1% aqueous solution of ammonium persulfate (20 ml) was added to the autoclave, whereby polymerization started immediately. The reaction was continued while maintaining the initial pressure with the occasional supply of TFE. After 5.5 hours, the gas was released to stop the reaction. The obtained reaction mixture (white aqueous dispersion)

contained a pre-segmented polymer in a concentration of 12.6 % by weight.

The above obtained reaction mixture (300 ml) was charged in a 1000 ml volume glass made reaction vessel, and the atmosphere was substituted with a mixture of HFP and VdF in a molar ratio of 55:45 to make a pressure of 12 kg/cm$^2$G at 30° C. Then, irradiation with ultraviolet rays was carried out in the same manner as in Example 2, whereby polymerization was initiated gradually. After 6 hours, the pressure decreased to 0.5 kg/cm$^2$G. The reaction mixture was frozen, and the coagulated product was collected, washed with water and dried to give a PTFE-like segmented polymer which is slightly tacky.

EXAMPLE 8

(1) Into a 3000 ml volume autoclave, demineralized water (1500 ml) and ammonium perfluorooctanoate (30 g) were charged, and the atmosphere was substituted with VdF. 6FI (0.5 ml (at 25° C.)) was added to the autoclave, and VdF was introduced therein to make a pressure of 21 kg/cm$^2$G at 80° C. Then, a 0.4% aqueous solution of ammonium persulfate (10 ml) was added to the autoclave, whereby polymerization started immediately. The polymerization was continued for 4 hours while maintaining the initial pressure by the occasional supply of VdF. The reaction mixture was cooled rapidly, and the gas was released to stop the polymerization. The obtained reaction mixture (white aqueous dispersion) containing a pre-segmented polymer in a concentration of 12.3% by weight was frozen, and the coagulated product was collected, washed and dried to give the pre-segmented polymer as a powder. Intrinsic viscosity, [$\eta$]=0.84 (35° C., dl/g, dimethylacetamide).

(2) Into a 1000 ml volume glass made reaction vessel, the reaction mixture as obtained in (1) (70 ml) and demineralized water (230 ml) were charged, and the atmosphere was substituted with nitrogen gas to make a pressure of 0.5 kg/cm$^2$G at 70° C. MMA (10 ml) was introduced into the reaction vessel, and a 0.1% aqueous solution of ammonium persulfate (10 ml) was added thereto, whereby polymerization started immediately. After 3 hours, MMA was almost consumed, and the polymerization was continued for an additional 4 hours. The resulting dispersion was extremely stable. After freezing, the coagulated product was collected, washed with water and dried to give a segmented polymer having a polymer segment of MMA in a content of 51% by weight as a powder. The segmented polymer was soluble in acetone, chloroform, toluene, etc., and the resulting solution could form a film on a glass plate. The film was somewhat brittle but, on heating at 200° C., became hard, tough and transparent.

EXAMPLE 9

(1) Into a 3000 ml volume autoclave, the reaction mixture comprising the pre-segmented polymer as obtained in Example 8 (1) (400 ml) and demineralized water (600 ml) were charged, and the atmosphere was substituted with a mixture of HFP and VdF in a molar ratio of 22:78 to make a pressure of 14 kg/cm$^2$G at 80° C. Then, a 0.4% aqueous solution of ammonium persulate (10 ml) was added to the reaction apparatus, whereby polymerization started immediately. After 2.5 hours, the pressure decreased to about 12 kg/cm$^2$G, and the reaction stopped.

(2) To the above obtained reaction mixture, a 0.4% aqueous solution of ammonium persulfate (5 ml) was added, whereby polymerization started again. After 1.8 hours, the reaction stopped. A 0.4% aqueous solution of ammonium persulfate (5 ml) was again added thereto so as to continue the reaction. The reaction was interrupted after 7 hours by lowering the temperature and releasing the gas rapidly.

(3) Each of the reaction mixtures obtained in (1) and (2) was frozen, and the coagulated product was collected, washed with water and dried to give a segmented polymer as a powder.

The segmented polymer was dissolved in hot acetone to make a solution, which was uniform even at room temperature. Application of the solution onto a glass plate gave a tough film. By the IR absorption spectrum, the film was proved to be low in crystallinity but rich in $\beta$-type crystalline structure, since remarkable absorptions were observed at 980, 800, 770, 617 and 536 cm$^{-1}$.

Also, the said segmented polymer could be molded by the use of a hot plate to make a transparent sheet.

Further, the X ray diffraction pattern of a sheet obtained by compression molding the segmented polymer at 200° C. and cooling the molded product rapidly was different from that of a sheet of PVdF itself as understood from FIG. 1 of the accompanying drawings wherein the curves (a), (b) and (c) are respectively the X ray diffraction pattern of the film made of conventional PVdF, that of the film made of the segmented polymer obtained in (1) and that of the film made of the segmented polymer obtained in (2), the dotted line indicating that of the film made of the segmented polymer obtained in (2) according to a solution casting method.

Figure 2:
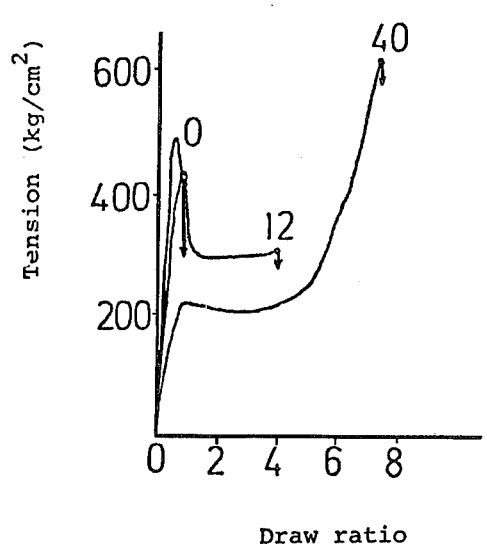

The relationship between the tension and the stretching ratio at 25° C. on a sheet prepared by heat molding the segmented polymer is shown in FIG. 2 wherein the number at the shoulder of each curve indicates the weight proportion (%) of the rubbery segment (i.e. the polymer segment of HFP/VdF) to the segmented polymer. The curve having the number "0" at the shoulder is the pre-segmented polymer obtained in Example 8 (1), and the other curves are those with the segmented polymers obtained in Example 9. The arrow mark indicates the occurrence of breakage. From this Figure, it is understood that the introduction of a polymer segment of HFP/VdF to PVdF results in the increase of elongation and the improvement of brittleness, though such product is somewhat softened.

The segmented polymer obtained by the above Example is usable for the manufacture of a film element excellent in dielectric constant, piezoelectric modulus, etc.

EXAMPLE 10

Into a 1000 ml volume glass made reaction vessel, the reaction mixture comprising the segmented polymer (having two polymer segments) as obtained in Example 9 (2) (100 ml) and demineralized water (200 ml) were charged, and the atmosphere was substituted with nitrogen gas to make a pressure of 0.5 kg/cm$^2$G. MMA (2.5 ml) was introduced into the reaction vessel, and the temperature was elevated to 70° C. while stirring. By the addition of a 0.1% aqueous solution of ammonium persulfate (10 ml), polymerization was initiated. MMA was completely consumed after about 3 hours. The reaction mixture was frozen, and the coagulated product was collected, washed with water and dried to give a segmented polymer (having three polymer segments) as a powder. The segmented polymer was soluble in acetone, and the resultant solution could form a tough film on a glass plate.

EXAMPLE 11

(1) In a 3000 ml volume autoclave, demineralized water (1500 ml) and ammonium perfluorooctanoate (7.5 g) were charged, and the atmosphere was substituted with a mixture of HFP and VdF in a molar ratio of 55:45 to make a pressure of 14 kg/cm$^2$G. $CF_2(CFClCF_2I)_2$ (0.5 ml) was introduced into the autoclave, the temperature was elevated to 80° C. under stirring and a 10% aqueous solution of ammonium persulfate (10 ml) was added thereto. Polymerization was carried out with the occasional supply of a mixture of HFP and VdF in a molar ratio of 22:78 to maintain a pressure of 13 to 15 kg/cm$^2$G. After 2 hours, the temperature was lowered and the gas was released rapidly to stop the polymerization. The reaction mixture was a remarkably turbid dispersion having a solids content of 11% by weight. After freezing, the coagulated product was collected, washed with water and dried to give a pre-segmented polymer having an iodine content of 0.31% by weight. Intrinsic viscosity, $[\eta]=0.34$ (35° C., dl/g, methylethylketone).

(2) In a 3000 ml volume autoclave, the dispersion obtained in (1) (550 ml) and demineralized water (450 ml) were charged, and polymerization was carried out in the same manner as in (1) but not adding ammonium persulfate to the reaction system. After 4.5 hours, the polymerization was stopped. The resulting dispersion had a solids content of 24% by weight. After freezing, the coagulated product was collected, washed with water and dried to give a presegmented polymer having an iodine content of 0.051% by weight. Intrinsic viscosity, $[\eta]=0.86$ (35° C., dl/g, methylethylketone).

(3) In a 3000 ml volume autoclave, the dispersion obtained in (2) (500 ml) and demineralized water (500 ml) were charged, and polymerization was carried out in the same manner as in (1) but adding a 0.4% aqueous solution of ammonium persulfate (6 ml) to the reaction system in every 4 hours. After 14.5 hours, the polymerization was stopped. The resulting dispersion had a solids content of 37% by weight. After freezing, the coagulated product was collected, washed with water and dried to give a pre-segmented polymer. Intrinsic viscosity, $[\eta]=1.51$ (35° C., dl/g, methylethylketone).

(4) In a 3000 ml volume autoclave, the dispersion obtained in (2) (500 ml) and demineralized water (500 ml) were charged, and the atmosphere was substituted with VdF to make a pressure of 22 kg/cm$^2$G at 80° C. Polymerization started immediately without adding any initiator to the reaction system, and the pressure was reduced to 2.4 kg/cm$^2$G after 50 minutes. The temperature was lowered and the gas was released rapidly. The reaction mixture was an aqueous dispersion having a solids content of 15% by weight. After freezing, the coagulated product was collected, washed with water and dried to give a segmented polymer as a non-tacky, rubbery powder, which had an iodine content of 0.047% by weight. Intrinsic viscosity, $[\eta]=1.26$ (35° C., dl/g, dimethylformamide). The segmented polymer contained a polymer segment of VdF in 9.7% by weight and was soluble in hot acetone.

(5) In a 3000 ml volume autoclave, the dispersion obtained in (3) (500 ml) and demineralized water (500 ml) were charged, and the atmosphere was substituted with VdF to make a pressure of 22 kg/cm$^2$G at 80° C. After 20 minutes, a 0.2% aqueous solution of ammonium persulfate (10 ml) was added to the autoclave, whereby polymerization started immediately and the pressure was reduced to 5 kg/cm$^2$G after 80 minutes. The polymerization was stopped. Then, the resulting dispersion having a solids content of 23% by weight was frozen, and the coagulated product was collected, washed with water and dried to give a segmented polymer a rubbery powder. Intrinsic viscosity, $[\eta]=1.64$ (35° C., dl/g, dimethylacetamide). The content of the polymer segment of VdF in the segmented polymer was 12% by weight.

(6) In a 3000 ml volume autoclave, the dispersion obtained in (3) (250 ml) and demineralized water (750 ml) were charged, and the atmosphere was substituted with TFE to make a pressure of 9.3 kg/cm$^2$G at room temperature. Then, VdF was introduced into the autoclave to make a pressure of 12.2 kg/cm$^2$G, and the temperature was elevated to 70° C., whereby the pressure was raised to 14 kg/cm$^2$G. Addition of a 0.1% aqueous solution of ammonium persulfate (10 ml) resulted in the immediate starting of polymerization. After 11 minutes, the pressure was reduced to 12.3 kg/cm$^2$G. The temperature was lowered and the gas was released rapidly to stop the polymerization. The resulting dispersion was frozen, and the coagulated product was collected, washed with water and dried to give a segmented polymer as a rubbery material. The segmented polymer was hardly soluble in hot acetone and had a polymer segment of TFE and VdF in a content of 10% by weight, the molar ratio of TFE and VdF in the polymer segment being 75:25.

Figure 3:
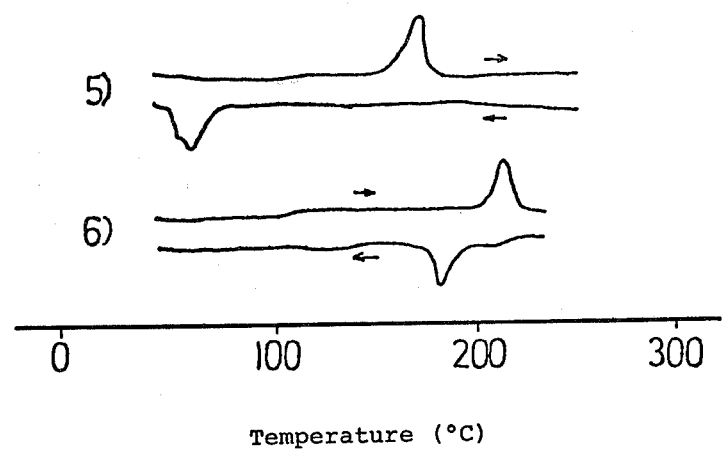

The patterns of temperature elevation and depression of the segmented polymers obtained in (5) and (6) in the differential thermal analysis (temperature elevation speed, 10° C./min) are shown in FIG. 3, wherein the curves (5) and (6) correspond respectively to the polymer segments obtained in (5) and (6).

Figure 4:
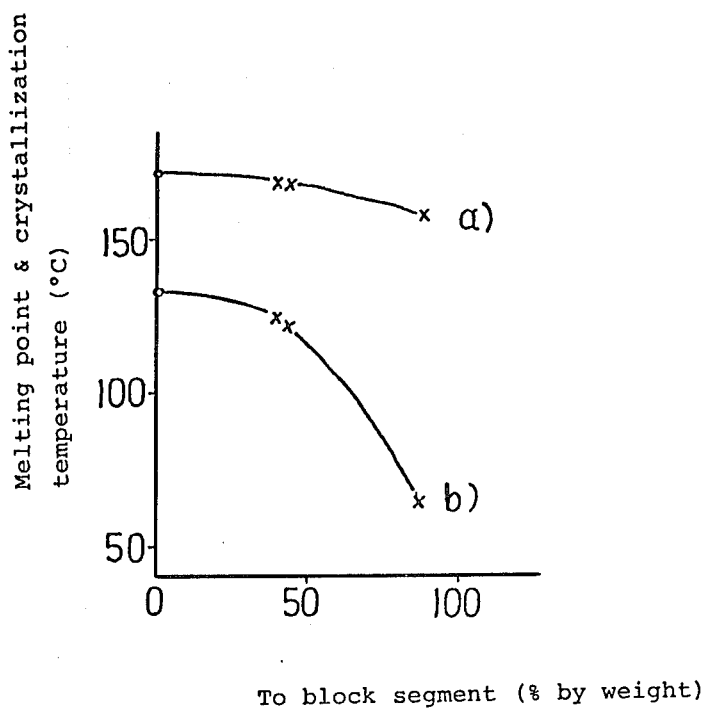

The melting temperature and the crystallization temperature of crystalline segmented polymers are influenced by the proportion of the polymer segments, the molecular weights of the polymer segments, the amount of the contaminating non-segmented polymers, etc. The influence caused by the compatibility between the polymer segments in segmented polymers is particularly remarkable. The influence in a segmented polymer having a polymer segment of HFP and VdF in a molar ratio of 22:78 and a polymer segment of VdF is shown in FIG. 4, wherein the axis of the ordinate indicates the temperature, the axis of the abscissa indicates the weight % of the polymer segment of VdF to the segmented polymer and the curves (a) and (b) represent respectively the variations of the melting temperature and of the crystallization temperature.

Figure 5:
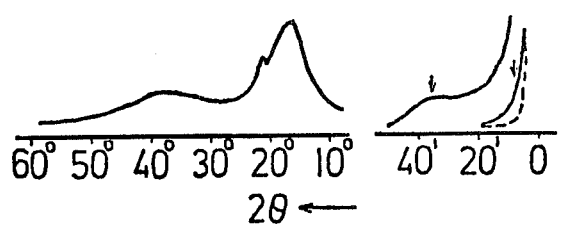

Compression molding of the segmented polymer obtained in (5) at an elevated temperature such as 200° C. can afford a transparent, rubbery sheet. Gradual cooling of the molded sheet results in a sufficient crystallization of the polymer segment of VdF. The results of the measurement of X ray broad angle diffraction and low angle scattering on a specimen of such sheet are shown in FIG. 5, wherein (A) indicates the broad angle diffraction pattern and (B) indicates the low angle scattering pattern. In the broad angle diffraction pattern, a peak is seen at $2\theta=20°$ as the shoulder of a peak of the amorphous portion having a maximum at $2\theta=17°-18°$. In the low angle scattering pattern, a peak at $2\theta=35'$ is probably due to the crystalline block of the polymer segment of VdF.

The segmented polymer obtained in (5) is insoluble in methylethylketone but soluble in hot acetone and also in dimethylacetamide at room temperature. The intrinsic viscosities (dl/g) of the pre-segmented polymer obtained in (3) and the segmented polymer obtained in (5) determined by dissolving in acetone or dimethylacetamide at 35° C. are as follows:

| Polymer | Solvent Acetone | Dimethylacetamide |
|---|---|---|
| (3) | 1.41 | 1.40 |
| (5) | 1.55 | 1.64 |

Figure 6:
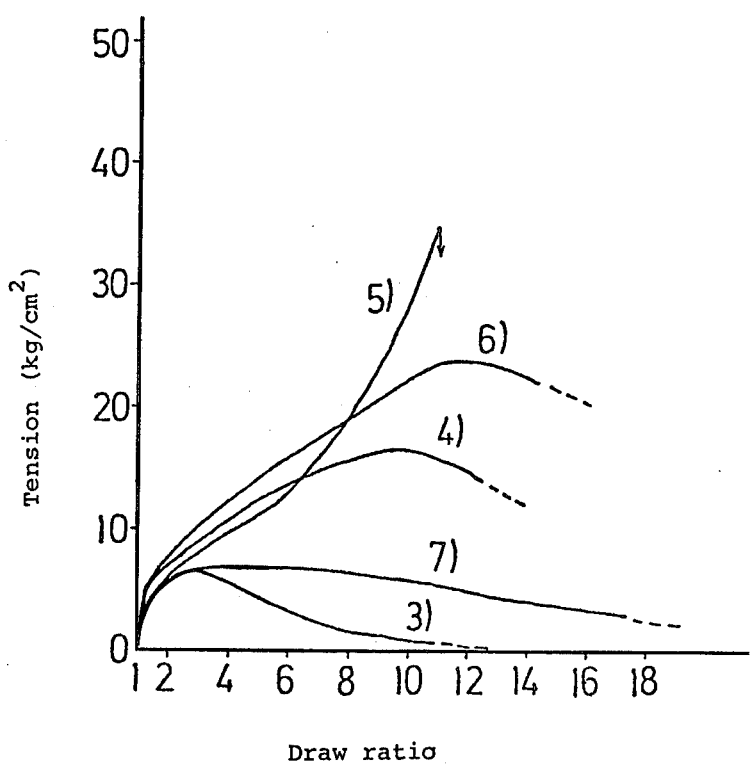

The segmented polymer obtained in (3) was blended with the pre-segmented polymer comprising a polymer segment of PVdF as obtained in Example 8 (1) in a dispersion state to make a blend containing the pre-segmented polymer in an amount of 12% by weight (the blend being designated as (7)). The blend (7), the pre-segmented polymer (3) and the segmented polymers (4), (5) and (6) were each molded by the aid of a hot plate of 220° C. to make a sheet, which was cooled rapidly. The cooled sheet of 0.4 to 0.7 mm thick was cut to make a dumbbell type specimen, and the specimen was subjected to a tension-elongation test by the use of a Tensilon UT II type tensile tester. The results are shown in FIG. 6, wherein the axis of the ordinate indicates the tension and the axis of the abscissa indicates the draw ratio when elongated at 23° C. with a pulling rate of 10 cm/min.

Figure 7:
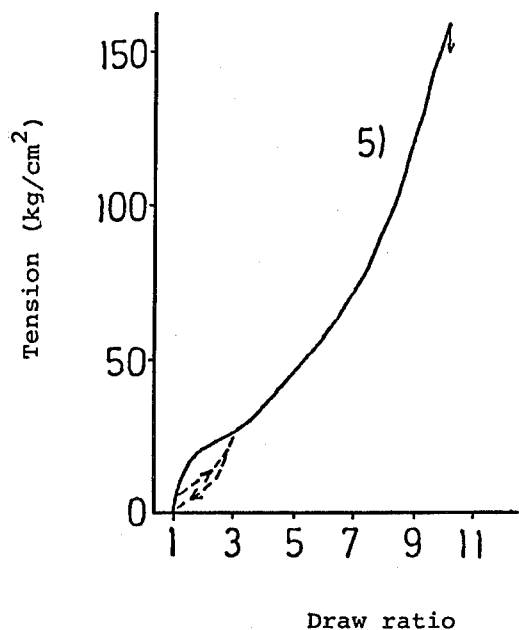
Figure 8:
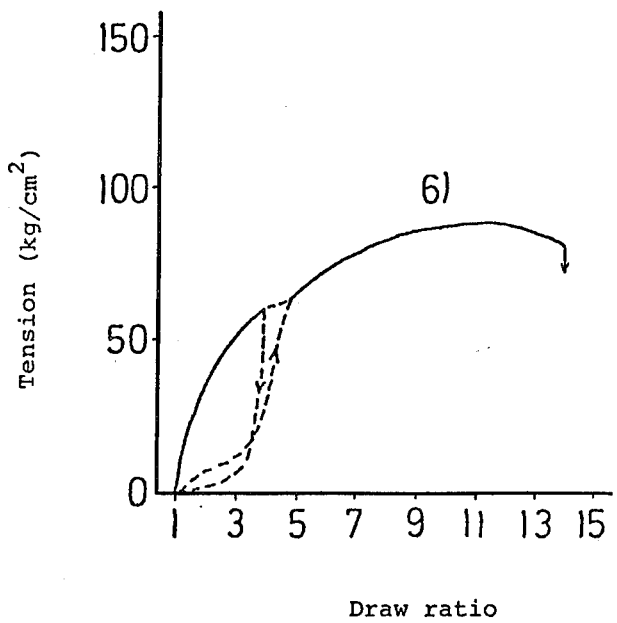

The segmented polymers (5) and (6) were each kneaded by the aid of a kneading roll at 100° to 130° C. for about 5 minutes so that it became soft and showed a slackened state. Molding with a hot plate of 200° C. gave a rubbery sheet in an ordinary state, i.e. recovered from the slackened state. The results of the tension-elongation test of such sheets are shown in FIG. 7 indicating the relationship on the sheet prepared from the segmented polymer (5) and FIG. 8 indicating the relationship on the sheet prepared from the segmented polymer (6). In these Figures, the solid line and the broken line in the course of the curve show a hysteresis loop.

The segmented polymers obtained in the above Example are thus improved in tension characteristics when kneaded at an elevated temperature such as 100° C. or higher. The sheets prepared from them are soluble in dimethylacetamide. When incorporated with a filler such as carbon black or magnesium oxide, an increase in strength is observed.

EXAMPLE 12

(1) In a 3000 ml volume autoclave, demineralized water (1500 ml) and ammonium perfluorooctanoate (7.5 g) were charged, and the atmosphere was substituted with a mixture of HFP and VdF in a molar ratio of 55:45 to make a pressure of 14 kg/cm$^2$G. $CF_2(CFClCF_2I)_2$ (0.5 ml) was introduced into the autoclave, the temperature was elevated to 80° C. under stirring and a 3% aqueous solution of ammonium persulfate (10 ml) was added thereto. Polymerization was carried out with the occasional supply of a mixture of HFP and VdF in a molar ratio of 22:78 to maintain a pressure of 13 to 15 kg/cm$^2$G. When a time of 7 hours elapsed, an additional amount (10 ml) of a 0.5% aqueous solution of ammonium persulfate was introduced into the reaction system. After 10.8 hours, the temperature was lowered and the gas was released rapidly to stop the polymerization. The resulting dispersion had a solids content of 11% by weight.

(2) In a 3000 ml volume autoclave, the dispersion obtained in (1) (500 ml) and demineralized water (500 ml) were charged, and polymerization was carried out in the same manner as in (1) but using a 0.2% aqueous solution of ammonium persulfate (10 ml). In every 4 hours, a 0.2% aqueous solution of ammonium persulfate (5 ml) was added to the reaction system. After 14 hours, the polymerization was stopped. The resulting dispersion had a solids content of 20.8% by weight. After freezing, the coagulated product was collected, washed with water and dried to give a presegmented polymer. Intrinsic viscosity, [$\eta$]=1.09 (35° C., dl/g, methylethylketone).

(3) In a 3000 volume autoclave, the dispersion obtained in (2) (400 ml) and demineralized water (600 ml) were charged, and the atmosphere was substituted with TFE to make a pressure of 9.5 kg/cm$^2$G at room temperature. Then, a mixture of TFE and ethylene in a molar ratio of 55:45 was introduced into the autoclave to make 13.5 kg/cm$^2$G, the temperature was elevated to 70° C. and a 0.1% aqueous solution of ammonium persulfate (10 ml) was added thereto. Polymerization was carried out for 3 hours with the occasional supply of a mixture of tetrafluoroethylene and ethylene in a molar ratio of 55:45 to maintain a pressure of 15.5 to 16 kg/cm$^2$G. The temperature was lowered and the gas was released rapidly. The reaction mixture was an aqueous dispersion having a solids content of 8.8% by weight. After freezing, the coagulated product was collected, washed with water and dried to give a segmented polymer as a rubbery powder, which was insoluble in acetone. The segmented polymer contained a polymer segment of TFE and ethylene in an amount of 13% by weight.

Figure 9:
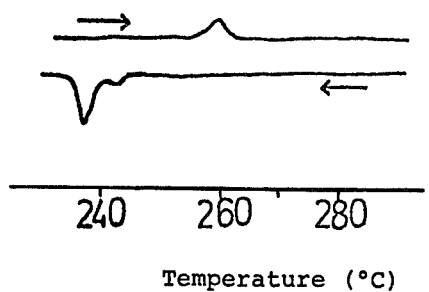

The pattern of the segmented polymer in the differential thermal analysis is shown in FIG. 9, from which it is understood that the compatibility of the polymer segment of TFE and ethylene with that of HFP and VdF is relatively low since the depression in the crystallization temperature is not remarkable.

Figure 10:
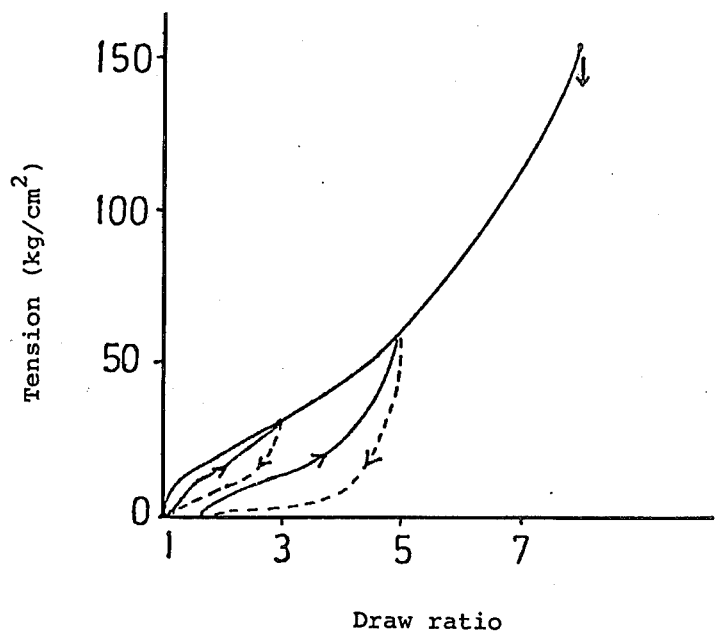

The segmented polymer was molded by the use of a hot plate of 260° C. in a sheet, which was gradually cooled. The cooled sheet of 0.6 mm thick was cut to make a dumbbell form specimen. The specimen was subjected to a tension-elongation test by the use of a Tensilon tensile tester with a pulling rate of 10 cm/min. The results are shown in FIG. 10, wherein a master curve showing the relationship of the tension with the draw ratio and a hysteresis loop are given.

EXAMPLE 13

(1) In a 3000 ml volume autoclave, demineralized water (1500 ml) and ammonium perfluorooctanoate (7.5 g) were charged, and the atmosphere was substituted with a mixture of TFE and VdF in a molar ratio of 10:90. 6FI (0.5 ml) was introduced into the autoclave, the TFE-VdF mixture was added to make a pressure of 15 kg/cm$^2$G at 80° C. and a 0.2% aqueous solution of ammonium persulfate (40 ml) was added thereto. Polymerization was carried out with the occasional supply of the TFE-VdF mixture to maintain a pressure of 14 to 16 kg/cm$^2$G. After 8 hours, the temperature was lowered and the gas was released rapidly to stop the polymerization. The resulting dispersion had a solids content of 9.8% by weight. After freezing, the coagulated product was collected, washed with water and dried to give a presegmented polymer as spheres of $0.036\mu$ in particle size.

(2) In a 3000 ml volume autoclave, the dispersion obtained in (1) (400 ml) and demineralized water (600 ml) were charged, and the atmosphere was substituted with TFE to make a pressure of 2 kg/cm$^2$G at 70° C. A 0.1% aqueous solution of ammonium persulfate (10 ml) was added to the autoclave. Polymerization was carried out for 2 hours until the pressure was reduced to 1.3 kg/cm$^2$G. The temperature was lowered and the gas was released rapidly to stop the polymerization. The resulting dispersion was frozen, and the coagulated product was collected, washed with water and dried to give a segmented polymer as a tacky powder.

On the electron microscopic observation, it was recognized that the particles of the powder are spherical, have an average particle size of $0.065\mu$ and possess uneven surfaces.

As the result of the extraction with acetone by the use of a Soxhlet's extractor for 18 hours, there was recovered soluble materials containing no polymer segment of TFE, of which the weight was 48% by weight based on the segmented polymer. The insoluble materials could afford a slightly milky, transparent sheet, of which the hardness was considerably higher than that of a sheet made of the soluble materials.

Figure 11:
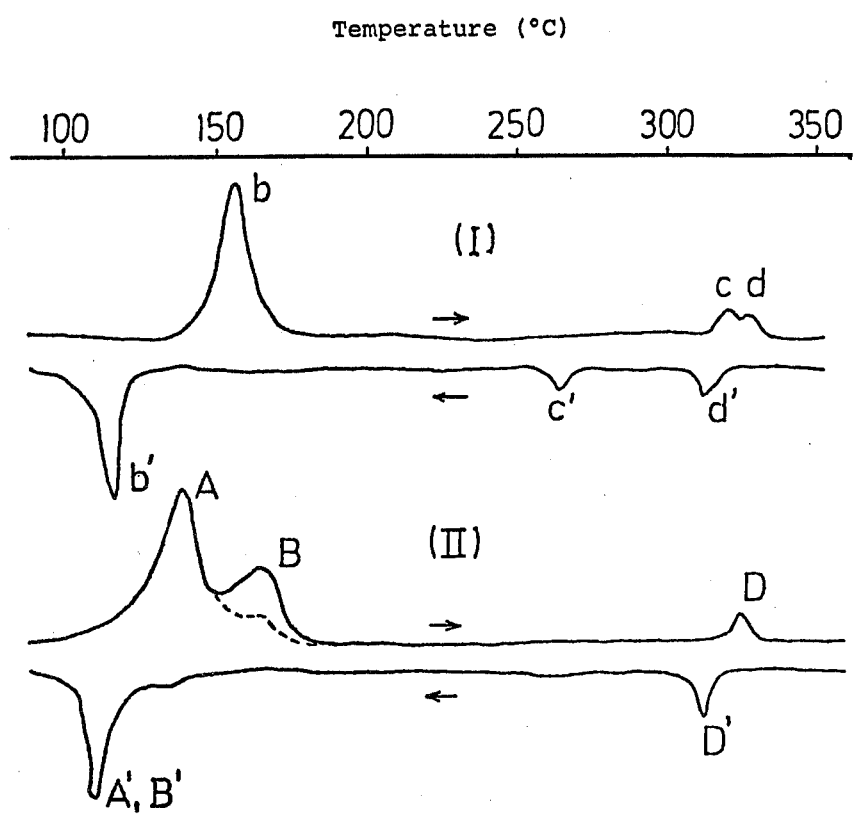

The patterns of the segmented polymer and a blend of the pre-segmented polymer comprising a polymer segment of TFE as obtained in Example 7 and the pre-segmented polymer comprising a polymer segment of TFE and VdF as obtained in (1) of Example 13 in a dispersion state in the differential thermal analysis with a temperature elevation speed of 10° C./min are shown in FIG. 11. In this Figure, the patterns (I) and (II) correspond respectively to those of the segmented polymer and the blend of the pre-segmented polymers. A is a peak inherent to the polymer segment of VdF and TFE, b and B are peaks based on the portion of the polymer segment of VdF and TFE combined with the polymer segment of TFE, c is a peak based on the portion of the polymer segment of TFE combined with the polymer segment of VdF and TFE, and d and D are due to the polymer segment of TFE. In the blend of the pre-segmented polymers, B gradually disappears by effecting repeatedly the melting and crystallizing. In the segmented polymer, no change of B is observed. When kneaded well at an elevated temperature, i.e. higher than the melting point of PTFE, the segmented polymer can afford a transparent film but the blend of the pre-segmented polymers can not.

EXAMPLE 14

In a 1000 ml volume glass made reaction vessel, the reaction mixture comprising the pre-segmented polymer as obtained in Reference Example 2 (70 ml) and demineralized water (230 ml) were charged, and the atmosphere was substituted with nitrogen gas to make a pressure of 0.5 kg/cm$^2$G. 1,1,2,2-Tetrahydro-7-trifluoromethylperfluorooctyl acrylate (12 g) was added to the reaction vessel, and the temperature was elevated to 70° C. under stirring. Then, a 0.1% aqueous solution of ammonium persulfate (10 ml) was introduced into the reaction vessel, whereby polymerization started. After 5 hours, the polymerization was completed. The resulting dispersion was weakly acidic.

The above dispersion was neutralized with dilute ammonia water, shaken in a sealed flask at 80° C. for 12 hours and adjusted to pH 8 with ammonia. A gauze was immersed in the resulting solution for a while, taken out therefrom and dried at 80° C. for 3 hours. The gauze was placed on a slant at 45° C., and water and n-heptane were dropped thereon but run out without being kept by the gauze. Thus, water-repellent and oil-repellent properties were imparted to the gauze.

Besides, the said dispersion was frozen, and the coagulated product was collected, washed with water and dried to give a segmented polymer as powder, which was soluble in tetrahydrofuran, acetone, etc. Its solution in tetrahydrofuran or acetone could also impart water-repellent and oil-repellent properties to a gauze.

EXAMPLE 15

(1) In a 3000 ml volume autoclave, ammonium perfluorooctanoate (1 g) and demineralized water (1000 ml) were charged, and the atmosphere was substituted with HFP. 4-Iodo-5-chloroperfluoropentene-1 ($CF_2$=$CFCF_2CFICF_2Cl$) (1.8 ml) was added to the autoclave, HFP was introduced therein to make 17.5 kg/cm$^2$G at 80° C., and then VdF was added thereto to make a pressure of 20.3 kg/cm$^2$G. By the addition of a 1% aqueous solution of ammonium persulfate (50 ml), polymerization started and was continued for 8 hours, during which the pressure was reduced to 1 kg/cm$^2$G. The reaction mixture was a slightly turbid dispersion having a solids content of about 2% by weight. On evaporation, there was obtained a pre-segmented polymer as a liquid rubber.

(2) In a 3000 ml volume autoclave, the dispersion obtained in (1) (100 ml) and demineralized water (200 ml) were charged, and the atmosphere was substituted with nitrogen to make a pressure of 0.5 kg/cm$^2$G. Diisopropyl peroxydicarbonate (1 ml) was introduced into the autoclave at room temperature, and the contents were stirred for 30 minutes and gradually heated to 60° C. in 1 hour. Thereafter, stirring was continued at this temperature for 13 hours. The resulting dispersion has no smell of peroxides.

Figure 12:
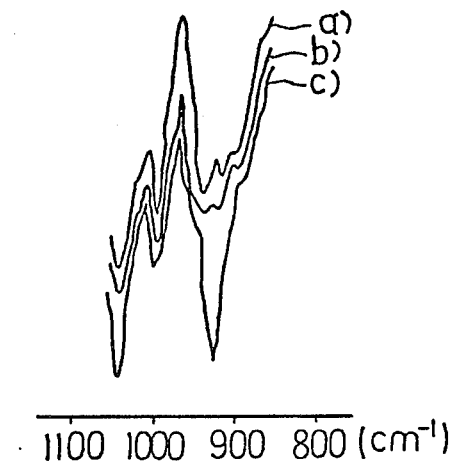

The IR absorption spectra of the dispersion as above obtained (designated as (b)), a copolymer of HFP and VdF having the same composition as above (designated as (a)) and the pre-segmented polymer obtained in (1) (designated as (c)) around 920 cm$^{-1}$ are shown in FIG. 12, from which it is understood that the iodine atom is eliminated in the product in the dispersion.

Still, 4-iodo-5-chloroperfluoropentene-1 is a liquid obtainable by addition of iodine chloride to perfluoropentadiene-1,4 and having a boiling point of 54.5° C./50 mmHg and a specific gravity of 2.13 (at 20° C.) In the IR absorption spectrum, it shows an absorption attributable to the double bond at 1780 cm$^{-1}$.

EXAMPLE 16

(1) In a 3000 ml volume autoclave, perfluorovinylacetic acid (3.5 g) and demineralized water (900 ml) were charged, and the atmosphere was substituted with HFP to make a pressure of 2.0 kg/cm$^2$G at 80° C. and then with a mixture of VdF, HFP and perfluorovinylacetic acid in a molar ratio of 77.3:22:0.7 to make a pressure of 10 kg/cm$^2$G at the said temperature. A solution of ammonium persulfate (2.9 g) in water (100 ml) was added to the autoclave, whereby polymerization started immediately. The polymerization was continued for 2.5 hours while maintaining a pressure of 9.5 to 10.5 kg/cm$^2$G by the occasional supply of the said monomer mixture. The temperature was lowered and the gas was released rapidly to stop the polymerization. The resulting dispersion having a solids content of 32% by weight was treated with hydrochloric acid, and the coagulated product was collected, washed with water and dried to give a polymer. Intrinsic viscosity, $[\eta]=0.71$ (35° C., dl/g, methylethylketone).

(2) In a 3000 mol volume autoclave, ammonium perfluorooctanoate (7.5 g) and demineralized water (1400 ml) were charged, and the atmosphere was substituted with a mixture of HFP and VdF in a molar ratio of 55:45. 5-Chloro-4-iodoperfluoropentene-1 (1 ml) was introduced into the autoclave, the temperature was elevated to 80° C. and the said monomer mixture was added thereto to make a pressure of 15 kg/cm$^2$G. By addition of a solution of ammonium persulfate (1 g) in water (100 ml), polymerization was initiated and continued for 4.5 hours with the occasional supply of a HFP, VdF and 5-chloro-4-iodoperfluoropentene-1 in a molar ratio of 21.5:78:0.5 to maintain a pressure of 13 to 15 kg/cm$^2$G. The resulting dispersion having a solids content of 11.5% by weight was frozen, and the coagulated product was collected by filtration, washed with water and dried to give a pre-segmented polymer. Intrinsic viscosity, $[\eta]=0.27$ (35° C., dl/g, methylethylketone).

(3) In a 3000 ml volume autoclave, the dispersion obtained in (2) (500 ml) and demineralized water (500 ml) were charged, and the atmosphere was substituted with a mixture of HFP and VdF in a molar ratio of 55:45 to make a pressure of 15 kg/cm$^2$G at 80° C. Polymerization was carried out for 8.5 hours, during which a mixture of HFP, VdF and 4-iodo-5-chloroperfluoropentene-1 in a molar ratio of 21.5:78:0.5 was occasionally supplied for maintaining the initial pressure. Further, a 0.2% aqueous solution of ammonium persulfate (10 ml) was added to the reaction system 1 hour and 4 hours after the initiation of the polymerization. The resulting dispersion containing a solids content of 19.5% by weight was frozen, and the coagulated product was collected, washed with water and dried to give a segmented polymer as a rubbery material. Intrinsic viscosity, $[\eta]=0.59$ (35° C., dl/g, methylethylketone).

(4) In a 3000 ml volume autoclave, the dispersion obtained in (3) (500 ml) and demineralized water (500 ml) were charged, and the atmosphere was substituted with a mixture of TFE and ethylene in a molar ratio of 85:15 to make a pressure of 15 kg/cm$^2$G at 80° C. A 0.2% aqueous solution of ammonium persulfate (10 ml) was added to the autoclave, whereby polymerization was initiated. After 12 minutes, the pressure was reduced to 0.1 kg/cm$^2$G. The temperature was lowered and the gas was released rapidly to stop the polymerization. The resulting dispersion was frozen, and the coagulated product was collected, washed with water and dried to give a segmented polymer as a rubbery material.

(5) The polymer obtained in (1) (100 parts by weight) was blended with silver oxide (3 parts by weight) by the aid of rolls. By the IR absorption spectrum, it was confirmed that the carboxyl groups in the polymer were converted into —COOAg.

The above obtained blend was then admixed with the segmented polymer obtained in (3) (100 parts), kneaded well and formed into a sheet. The sheet (12 g) was heated at 150° C. for 30 minutes and then at 250° C. for 18 hours. The resulting sheet was brown colored and showed the properties as vulcanized rubber. It was swollen with acetone but not soluble therein.

EXAMPLE 17

(1) In a 200 ml volume reaction apparatus, water (50 ml), perfluorovinylacetic acid (CF$_2$=CFCF$_2$COOH) (10 ml), 4-iodo-5-chloroperfluoropentene-1 (CF$_2$=CFCF$_2$CFICF$_2$Cl) (0.2 ml) and ammonium persulfate (0.1 g) were charged, and the atmosphere was substituted with VdF to make a pressure of 29 kg/cm$^2$G at 60° C. Polymerization was initiated and continued for 3 hours, during which the initial pressure was maintained by adding VdF thereto. The temperature was lowered and the gas was released to stop the polymerization. The reaction mixture was a viscous, transparent solution, which was treated with hydrochloric acid to coagulate the produced pre-segmented polymer. The collected pre-segmented polymer (6.9 g) contained a 42 mol % of units of perfluorovinylacetic acid.

(2) In a 20 ml volume reaction apparatus, the solution obtained in (1) (10 ml), perfluorovinylacetic acid (7.5 ml), demineralized water (50 ml) and ammonium persulfate (40 mg) were charged, and polymerization was carried out in the same manner as in (1) for 4.2 hours. The reaction mixture was a highly viscous, transparent solution, which was treated with hydrochloric acid to coagulate the produced pre-segmented polymer. The collected pre-segmented polymer (6.7 g) contained a 41 mol % of units of perfluorovinylacetic acid.

(3) In a 200 ml volume reaction apparatus, the solution obtained in (2) (10 ml), perfluorovinylacetic acid (7.5 ml), demineralized water (50 ml) and ammonium persulfate (40 mg) were charged, and polymerization was carried out in the same manner as in (1) for 8 hours. The reaction mixture was a highly viscous, transparent solution, which was treated with hydrochloric acid to coagulate the produced pre-segmented polymer. The collected pre-segmented polymer (8.1 g) contained a 39 mol % of units of perfluorovinylacetic acid.

(4) The solution obtained in (3) (20 ml) was diluted with water (100 ml), and 4 N hydrochloric acid (20 ml) was dropwise added thereto under vigorous agitation. The precipitated polymer was collected, compressed and dissolved in demineralized water (100 ml). This operation was repeated three times. The resultant polymer was rinsed with a small amount of water and dried at 60° C. for several hours. The dried polymer was dissolved in demineralized water (50 ml), bubbled with nitrogen gas for 30 minutes and then charged in a 200 ml volume reaction apparatus together with ammonium persulfate (5 mg). The atmosphere was substituted with VdF to make a 10 kg/cm$^2$G at 30° C., and polymerization was carried out for 2.5 hours with the occasional supply of VdF to maintain the initial pressure. The gas was released to stop the polymerization. The reaction mixture comprising a segmented polymer was a somewhat turbid, semi-transparent, viscous liquid. No deposition was produced when it was allowed to stand.

The liquid was spread on a glass plate and placed in a dryer of 60° C. to evaporate water therefrom, whereby a transparent film was formed. Application of demineralized water onto the film resulted in swelling, and the area of the film became 5 folds larger within several minutes. Then, a drop of 4 N hydrochloric acid was put on the film, whereby an immediate shrinkage occurred to recover the original area. The above phenomenon was also observed when 10% sodium chloride solution was used in place of hydrochloric acid. The said film has a high strength and can be formed in fibers. Such fibers are useful as artificial muscle fibers, elements in engines, etc.

When the film formed on the glass plate is heated at an elevated temperature (e.g. 200° C.) and cooled, the polymer segment of hard quality is fixed so that the film can not be swollen any more even if demineralized water is applied thereto. The thus fixed film is excellent in hydrophilic property and strength. Therefore, it is useful as an ion exchange membrane. Still, the extent of the swelling and the strength can be controlled by varying the proportion of the polymer segment of VdF in the segmented polymer.

As explained above, the segmented polymers of the present invention, wherein each of the polymer segments has a molecular weight of not less than 10,000 (usually not exceeding 10,000,000) but at least one of them has a nolecular weight of not less than 30,000, can display various useful properties depending on the variation in the composition of the sequence of the polymer segments.

In general, the segmented polymers have all the properties inherent to each polymer segment present therein, though the major polymer segment(s) afford a greater influence. Advantageously, the unfavorable properties possessed by each polymer segment is improved in the segmented polymer. Such improvement is sometimes observed in a conventional blend mixture of the polymers corresponding to the polymer segments. But, in the blend mixture, the compatibility between the polymers is required, because otherwise they are separated from each other and the desired improvement is not attained. Quite different from such blend mixture, such compatibility is not required to be taken into consideration in case of the segmented polymer, since the polymer segments are chemically bonded to make a single polymeric material.

The segmented polymer of the invention is usually and advantageously prepared by emulsion polymerization. When, however, a relatively large amount of the iodinated compound is present in the reaction system for the production of a pre-segmented polymer, the particles of the pre-segmented polymer as produced are coagulated and, as the result, the reaction rate is much decreased. In order to avoid such disadvantages, the particles of the polymer corresponding to the polymer segment in the pre-segmented polymer may be added as the seed polymer to the reaction system prior to or in the course of the polymerization.

What is claimed is:

1. A segmented polymer comprising a sequence of two or more polymer segments, an iodine atom liberated from an iodinated compound bonded at a terminal position of said sequence and a fragment of the iodinated compound from which at least one iodine atom has been removed bonded at another terminal position of said sequence, whereby said sequence intervenes between said iodine atom and said fragment, wherein adjacent polymer segments are different in steric configuration or monomeric composition, at least the first polymer segment of said polymer segments containing fluorine and each polymer segment having a molecular weight of not less than 10,000 but at least one polymer segment having a molecular weight of not less than 30,000, the iodinated compound being a perhalohydrocarbon of 1 to 16 carbon atoms wherein at least one of the halogen atoms is an iodine atom but only one iodine atom is present on every two adjacent carbon atoms and the other halogen atoms consist of (1) fluorine atoms or (2) fluorine atoms and chlorine atoms but the number of chlorine atoms is not more than that of fluorine atoms and only one chlorine atom is present on one carbon atom, and which may have an oxygen linkage (—O—) between any two carbon atoms and/or include additionally —$CF_2H$ or =$CF_2$, and each of the polymer segments being constituted with the units of the monomer(s) selected from the following Groups (A) and (B), the said Group (A) consisting of fluorine-containing unsaturated polymerizable monomers of the formula $CF_2$=CXY wherein X is a hydrogen atom or a fluorine atom, and in the case of X being a hydrogen atom Y is a hydrogen atom, and in the case of X being a fluorine atom Y is a hydrogen atom, a chlorine atom, a fluorine atom, a trifluoromethyl group, a difluoromethyl group, a perfluoroalkoxy group of 1 to 3 carbon atoms, a group of the formula —$(CF_2)_m$COOM in which m is an integer of 0 to 3 and M is hydrogen, sodium or potassium, or a group of the formula —$(OCF_2)_p$—$(OCF_2CF_2)_q$—$(OCF_2CF(CF_3))_r$—Z in which Z is —COF, —COOM, —$SO_2F$ or —$SO_3M$, M being as defined above, and p, q and r are each an integer of 0 to 3 but at least one of them is not zero, and the said Group (B) consisting of unsaturated polymerizable monomers of 2 to 8 carbon atoms containing no fluorine atoms.

2. The segmented polymer according to claim 1, wherein the sequence consists of (a) a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, and (b) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, the weight proportion of the polymer segment (a) and the polymer segment (b) being 5–60:40–95.

3. The segmented polymer according to claim 1, wherein the sequence consists of (a) a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, (b) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, and (a') a polymer segment having a molecular weight of 10,000 to 400,000 and constituted with the units of vinylidene fluoride and tetrafluoroethylene in a molar ratio of 0–100:0–100 or of ethylene and tetrafluoroethylene in a molar ratio of 40–60:40–60, the weight proportion of the polymer segments (a) and (a') and the polymer segment (b) being 5–60:40–95.

4. The segmented polymer according to claim 1, wherein the sequence consists of (a) a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, and (b) a polymer segment having a molecular weight of 30,000–600,000 and constituted with the units of vinylidene fluoride, hexafluoropropylene or pentafluoropropylene and tetrafluoroethylene in a molar ratio of 45–90:5–50:0–35 or of perfluoro(methylvinyl ether), perfluoro(ethylvinyl ether) or perfluoro(propylvinyl ether), tetrafluoroethylene and vinylidene fluoride in a molar ratio of 15–75:0–85:0–85, the weight proportion of the polymer segment (a) and the polymer segment (b) being 40–60:40–60.

5. The segmented polymer according to claim 1, wherein the sequence consists of (a) a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, (b) a polymer segment having a molecular weight of 30,000–600,000 and constituted with the units of vinylidene fluoride, hexafluoropropylene or pentafluoropropylene and tetrafluoroethylene in a molar ratio of 45–90:5–50:0–35 or of perfluoro(methylvinyl ether), perfluoro(ethylvinyl ether) or perfluoro(propylvinyl ether), tetrafluoroethylene and vinylidene fluoride in a molar ratio of 15–75:0–85:0–85, and (a') a polymer segment having a molecular weight of 100,000 to 800,000 and constituted with the units of vinylidene fluoride, of hexafluoropropylene and tetrafluoroethylene in a molar ratio of 1–50:50–99 or of tetrafluoroethylene and ethylene in a molar ratio of 40–60:40–60, the weight proportion of the polymer segments (a) and (a') and the polymer segment (b) being 40–60:40–60.

6. The segmented polymer according to claim 1, wherein the sequence consists of (a) a polymer segment having a molecular weight of 30,000 to 1,200,000 and constituted with the units of vinylidene fluoride, hexafluoropropylene or pentafluoropropylene and tetrafluoroethylene in a molar ratio of 45–90:5–50:0–35, of perfluoro(methylvinyl ether), perfluoro(ethylvinyl ether) or perfluoro(propylvinyl ether), tetrafluoroethylene and vinylidene fluoride in a molar ratio of 15–75:0–85:0–85 or of trifluoroethylene and hexafluoropropylene in a molar ratio of 60–80:20–40, and (b) a polymer segment having a molecular weight of 30,000 to 10,000,000 and constituted with the units of tetrafluoroethylene and vinylidene fluoride in a molar ratio of 30–100:0–70, the weight proportion of the polymer segment (a) and the polymer segment (b) being 5–90:10–95.

7. The segmented polymer according to claim 1, wherein the sequence consists of (a) a polymer segment having a molecular weight of 30,000 to 1,200,000 and constituted with the units of vinylidene fluoride, hexafluoropropylene and tetrafluoroethylene in a molar ratio of 0–100:0–50:0–100, and (b) a polymer segment having a molecular weight of 10,000 to 100,000 and constituted with the units of methyl methacrylate and one or more other monomer(s) copolymerizable therewith in a molar ratio of 50–100:0–50, of styrene and one or more other monomer(s) copolymerizable therewith in a molar ratio of 50–100:0–50 or of vinyl chloride and one or more other monomer(s) copolymerizable therewith in a molar ratio of 50–100:0–50, the weight proportion of the polymer segment (a) and the polymer segment (b) being 10–95:5–90.

8. The segmented polymer according to claim 7, wherein the other monomer(s) copolymerizable with methyl methacrylate, styrene or vinyl chloride are selected from the group consisting of ethylenically unsaturated monomers which do not contain any fluorine atoms.

9. The segmented polymer according to claim 1, wherein the sequence consists of (a) a polymer segment having a molecular weight of 30,000 to 1,200,000 and constituted with the units of $CF_2=CF(CF_2)_{0-3}COOH$, vinylidene fluoride and tetrafluoroethylene in a molar ratio of 5–50:0–95:0–95 or of $CF_2=CFO(CF_2)_2COOH$ and tetrafluoroethylene in a molar ratio of 5–50:50–95, and (b) a polymer segment having a molecular weight of 30,000 to 10,000,000 and constituted with the units of vinylidene fluoride, tetrafluoroethylene and hexafluoropropylene in a molar ratio of 0–100:0–100:0–50 or of ethylene, tetrafluoroethylene or hexafluoropropylene in a molar ratio of 40–60:15–50:0–35, the weight proportion of the polymer segment (a) and the polymer segment (b) being 20–95:5–80.

10. A process for preparing a segmented polymer comprising a sequence of two or more polymer segments, an iodine atom liberated from an iodinated compound bonded at a terminal position of said sequence and a fragment of the iodinated compound from which at least one iodine atom has been removed bonded at another terminal position of said sequence, whereby said sequence intervenes between said iodine atom and said fragment, wherein adjacent polymer segments are different in steric configuration or monomeric composition, at least one of said polymer segments containing fluorine and each polymer segment having a molecular weight of not less than 10,000 but at least one polymer segment having a molecular weight of not less than 30,000, which comprises:

(1) the first step of subjecting at least one first monomer selected from the Group (A) defined below to radical polymerization in the presence of a radical-producing source and an iodinated compound to give a pre-segmented polymer comprising a polymer segment constituted by said first monomer, an iodine atom liberated from said iodinated compound and the fragment of said iodinated compound with at least one iodine atom removed therefrom, said iodine atom and said fragment being bonded to the terminal positions of said polymer segment whereby the polymer segment intervenes between said iodine atom and said fragment, and (2) the second step of subjecting at least one second monomer selected from Group (A) and (B) defined below to radical polymerization in the presence of a radical-producing source and the pre-segmented polymer produced in said first step to give a bi-segmented polymer comprising a sequence of the polymer segment present in the pre-segmented polymer and a polymer segment constituted by said second monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment;

the iodinated compound being a perhalohydrocarbon of 1 to 16 carbon atoms wherein at least one of the halogen atoms is an iodine atom but only one iodine atom is present on every two adjacent carbon atoms and the other halogen atoms consist of (1) fluorine atoms or (2) fluorine atoms and chlorine atoms but the number of chlorine atoms is not more than that of fluorine atoms and only one chlorine atom is present on one carbon atom, and which may have an oxygen linkage (—O—) between any two carbon atoms and/or include additionally —CF$_2$H or =CF$_2$;

the said Group (A) consisting of fluorine-containing unsaturated polymerizable monomers of the formula CF$_2$=CXY wherein X is a hydrogen atom or a fluorine atom, and in the case of X being a hydrogen atom Y is a hydrogen atom, and in the case of X being a fluorine atom Y is a hydrogen atom, a chlorine atom, a fluorine atom, a trifluoromethyl group, a difluoromethyl group, a perfluoroalkoxy group of 1 to 3 carbon atoms, a group of the formula —(CF$_2$)$_m$COOM in which m is an integer of 0 to 3 and M is hydrogen, sodium or potassium, or a group of the formula —(OCF$_2$)$_p$—(OCF$_2$CF$_2$)$_q$—(OCF$_2$CF(CF$_3$))$_r$—Z in which Z is —COF, —COOM, —SO$_2$F or —SO$_3$M, M being as defined above, and p, q and r are each an integer of 0 to 3 but at least one of them is not zero; and the said Group (B) consisting of unsaturated polymerizable monomers of 2 to 8 carbon atoms containing no fluorine atoms.

11. The process according to claim 10, wherein the iodinated compound has a polymerizable double bond, whereby said fragment of said iodinated compound additionally contains moieties originating from said first monomer and from said iodinated compound, the resulting segmented polymer containing said moieties.

12. The process according to claim 11, wherein the pre-segmented polymer has a polymerizable double bond, whereby said fragment additionally contains moieties originating from said second monomer and from said pre-segmented polymer, the resulting segmented polymer containing said moieties.

13. The process according to claim 10, followed by the third step of subjecting at least one third monomer selected from the Groups (A) and (B) to radical polymerization in the presence of a radical-producing source and the bi-segmented polymer produced in the second step to give a tri-segmented polymer comprising a sequence of the polymer segments present in the bi-segmented polymer and a polymer segment constituted by said third monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment.

14. The process according to claim 13, wherein the bi-segmented polymer has a polymerizable double bond, whereby said fragment additionally contains moieties originating from said third monomer and from said bi-segmented polymer, the resulting segmented polymer containing said moieties.

15. The process according to claim 13, followed by the fourth step of subjecting at least one fourth monomer selected from the Groups (A) and (B) to radical polymerization in the presence of a radical-producing source and the tri-segmented polymer produced in the third step to give a tetra-segmented polymer comprising a sequence of the polymer segments present in the tri-segmented polymer and a polymer segment constituted by said fourth monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment.

16. The process according to claim 15, wherein the tri-segmented polymer has a polymerizable double bond, whereby said fragment additionally contains moieties originating from said fourth monomer and from said tri-segmented polymer, the resulting segmented polymer containing said moieties.

17. The process according to claim 10, wherein the iodinated compound is a perhalohydrocarbon having 1 to 8 carbon atoms.

18. The process according to claim 10, wherein the iodinated compound is a perhalohydrocarbon wherein one or two of the halogen atoms are fluorine atoms.

19. The process according to claims 10, wherein the monomer(s) used in the radical polymerization in the second, third or fourth step are selected from said Group (A).

20. The process according to claims 10, wherein the monomer(s) used in the radical polymerization in the last step are selected from said Group (B).

21. The process according to claims 10, wherein the monomer(s) used in the radical polymerization in the last step are a mixture of monomers selected from said Group (A) and from said Group (B).

22. The process according to claim 10, wherein the radical-producing source is light, heat, an organic or inorganic peroxide or an azo compound.

23. The process according to claim 22, wherein the radical-producing source is ultraviolet rays.

24. The process according to claim 22, wherein the radical-producing source is a persulfate.

25. The process according to claim 11, followed by the third step of subjecting at least one third monomer selected from the Groups (A) and (B) to radical polymerization in the presence of a radical-producing source and the bi-segmented polymer produced in the second step to give a tri-segmented polymer comprising a sequence of the polymer segments present in the bi-segmented polymer and a polymer segment constituted by said third monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment.

26. The process according to claim 12, followed by the third step of subjecting at least one third monomer selected from the Groups (A) and (B) to radical polymerization in the presence of a radical-producing source and the bi-segmented polymer produced in the second step to give a tri-segmented polymer comprising a sequence of the polymer segments present in the bi-segmented polymer and a polymer segment constituted by said third monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment.

27. The process according to claim 14, followed by the fourth step of subjecting at least one fourth monomer selected from the Groups (A) and (B) to radical polymerization in the presence of a radical-producing source and the tri-segmented polymer produced in the third step to give a tetra-segmented polymer comprising a sequence of the polymer segments present in the tri-segmented polymer and a polymer segment constituted by said fourth monomer, an iodine atom liberated from the iodinated compound and a fragment of the iodinated compound with at least one iodine atom removed therefrom, said iodine atom and said fragment being bonded to the terminal positions of said polymer sequence whereby said sequence intervenes between said iodine atom and said fragment.

28. The process according to claim 13, wherein the iodinated compound is a perhalohydrocarbon having 1 to 8 carbon atoms.

29. The process according to claim 15, wherein the iodinated compound is a perhalohydrocarbon having 1 to 8 carbon atoms.

30. The process according to claim 13, wherein the iodinated compound is a perhalohydrocarbon wherein one or two of the halogen atoms are fluorine atoms.

31. The process according to claim 15, wherein the iodinated compound is a perhalohydrocarbon wherein one or two of the halogen atoms are fluorine atoms.

32. The process according to claim 13, wherein the monomer(s) used in the radical polymerization in the second, third or fourth step are selected from said Group (A).

33. The process according to claim 15, wherein the monomer(s) used in the radical polymerization in the second, third or fourth step are selected from said Group (A).

34. The process according to claim 13, wherein the monomer(s) used in the radical polymerization in the last step are selected from said Group (B).

35. The process according to claim 15, wherein the monomer(s) used in the radical polymerization in the last step are selected from said Group (B).

36. The process according to claim 13, wherein the monomer(s) used in the radical polymerization in the last step are a mixture of monomers selected from said Group (A) and from said Group (B).

37. The process according to claim 15, wherein the monomer(s) used in the radical polymerization in the last step are a mixture of monomers selected from said Group (A) and from said Group (B).

38. A segmented polymer, prepared by the process as claimed in claim 10.

39. The segmented polymer according to claim 1, wherein the iodinated compound has a polymerizable double bond, whereby said fragment of said iodinated compound additionally contains moieties originating from the monomers which constitute said polymer segments and from said iodinated compound.

40. The segmented polymer according to claim 39, wherein each of the polymer segments is constituted with the units of the monomer(s) selected from the following Groups (A) and (B), the said Group (A) consisting of fluorine-containing unsaturated polymerizable monomers of the formula $CF_2=CXY$ wherein X is a hydrogen atom or a fluorine atom, and in the case of X being a hydrogen atom Y is a hydrogen atom, and in the case of X being a fluorine atom Y is a hydrogen atom, a chlorine atom, a fluorine atom, a trifluoromethyl group, a difluoromethyl group, a perfluoroalkoxy group of 1 to 3 carbon atoms, a group of the formula $-(CF_2)_m-COOM$ in which m is an integer of 0 to 3 and M is hydrogen, sodium or potassium, or a group of the formula $-(OCF_2)_p-(OCF_2CF_2)_q-(OCF_2CF(CF_3))_r-Z$ in which Z is $-COF$, $-COOM$, $-SO_2F$ or $-SO_3M$, M being as defined above, and p, q and r are each an integer of 0 to 3 but at least one of them is not zero, and the said Group (B) consisting of unsaturated polymerizable monomers of 2 to 8 carbon atoms containing no fluorine atoms.

41. A segmented polymer, prepared by the process as claimed in claim 11.

42. A segmented polymer, prepared by the process as claimed in claim 12.

43. A segmented polymer, prepared by the process as claimed in claim 13.

44. A segmented polymer, prepared by the process as claimed in claim 14.

45. A segmented polymer, prepared by the process as claimed in claim 15.

46. A segmented polymer, prepared by the process as claimed in claim 16.

* * * * *